United States Patent
Bendix et al.

(10) Patent No.: US 8,427,652 B2
(45) Date of Patent: Apr. 23, 2013

(54) SYSTEMS AND METHODS FOR MEASURING GEOMETRIC CHANGES OF EMBEDDED PASSIVE MATERIALS DURING A LAMINATION PROCESS

(75) Inventors: Lendon L. Bendix, Melbourne, FL (US); Barry G. Grossman, Melbourne, FL (US); Mathew M. Kincaid, Indialantic, FL (US); Jon Tower, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 648 days.

(21) Appl. No.: 12/683,513

(22) Filed: Jan. 7, 2010

(65) Prior Publication Data

US 2011/0164256 A1 Jul. 7, 2011

(51) Int. Cl.
 *G01B 11/02* (2006.01)
(52) U.S. Cl.
 USPC ............................................... 356/496
(58) Field of Classification Search ................. 356/480, 356/482, 496, 498, 503, 506, 519
 See application file for complete search history.

(56) References Cited

U.S. PATENT DOCUMENTS

| | | | |
|---|---|---|---|
| 6,687,011 B1* | 2/2004 | Lee et al. | 356/480 |
| 6,886,365 B2* | 5/2005 | Rumpf et al. | 65/385 |
| 2005/0030551 A1* | 2/2005 | Rosakis et al. | 356/521 |
| 2008/0002206 A1* | 1/2008 | Cummings et al. | 356/445 |

* cited by examiner

*Primary Examiner* — Tarifur Chowdhury
*Assistant Examiner* — Jonathan Hansen
(74) *Attorney, Agent, or Firm* — Fox Rothschilds, LLP; Robert J. Sacco

(57) ABSTRACT

Systems (200) and methods (300) for measuring geometric changes of a passive material (414) when heat and pressure are applied thereto. The methods involve forming a pad (108, 510) on a passive material panel (410). The pad includes at least one of a layer of a passive material (414) and a layer of a metal (416). The methods also involve coupling an interferometer (810) to the pad. The method also involves forming a multi-layer structure by placing at least one substrate panel (400) on top of the passive material such that an aperture (602) formed in the substrate panel is aligned with the pad. Pressure and heat are applied to the multi-layer structure. Data is collected using the interferometer while the pressure and heat are applied to the multi-layer structure. The interferometer can include, but is not limited to, a Fabry-Perot interferometer, a Michelson interferometer and/or a Mach-Zehnder interferometer.

28 Claims, 18 Drawing Sheets

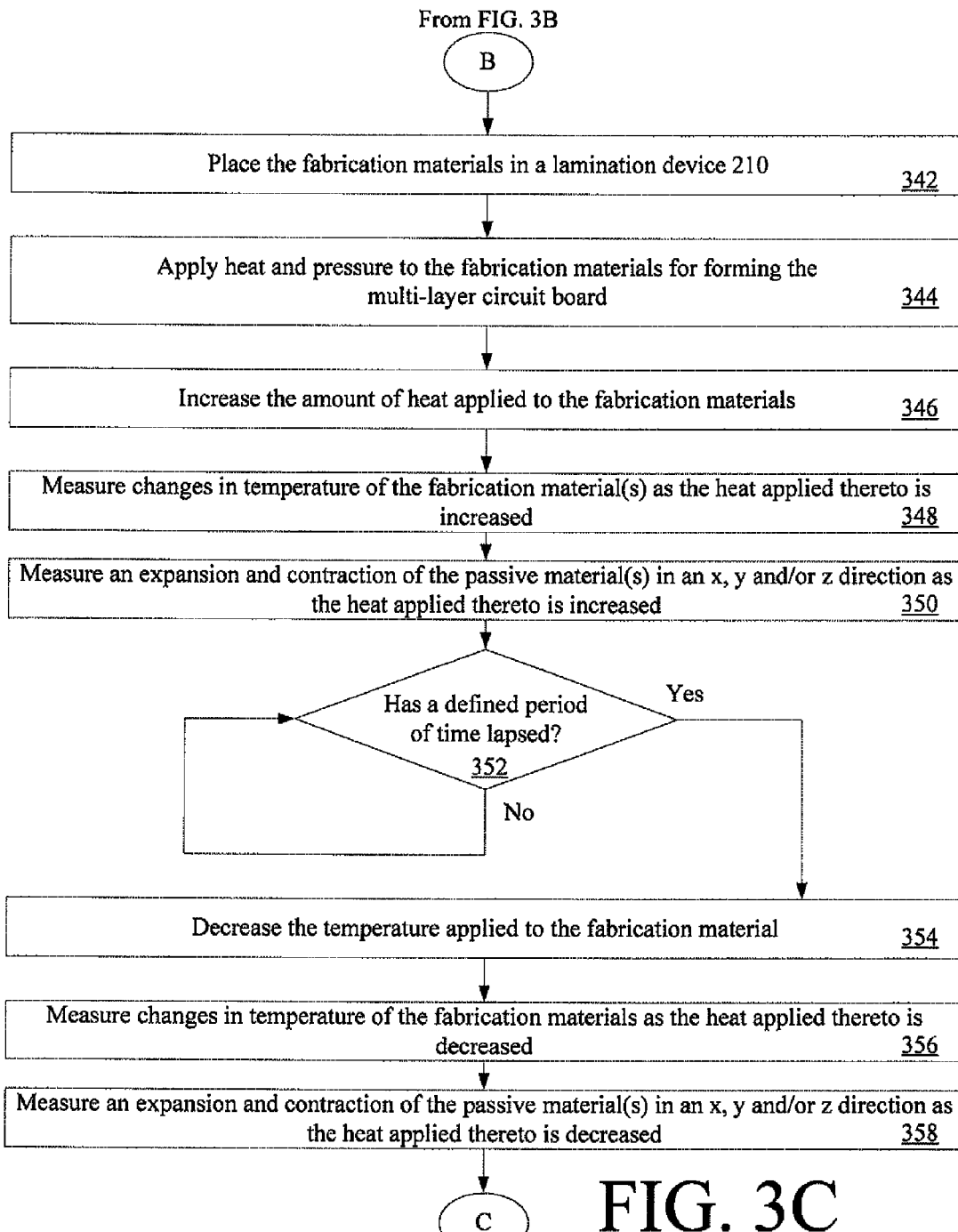

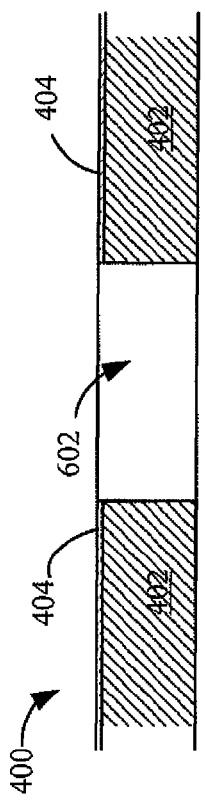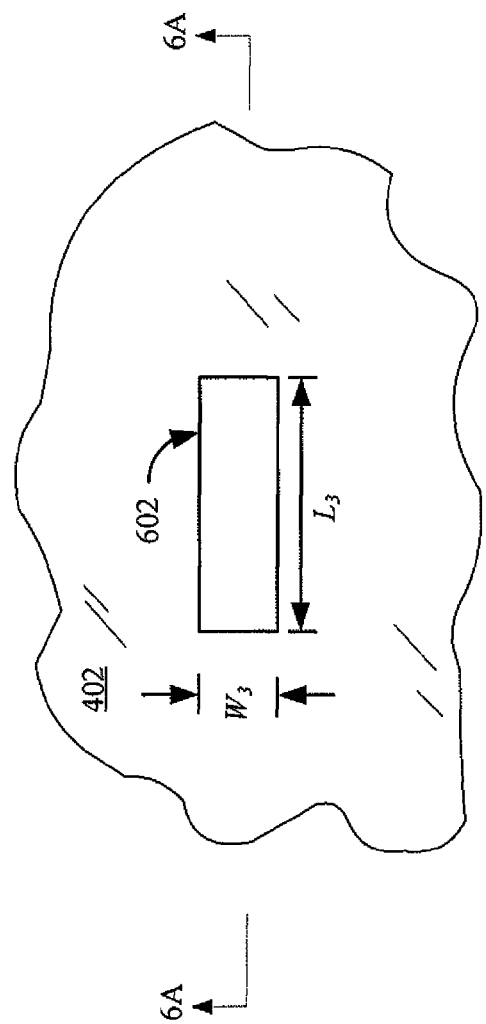

SYSTEMS AND METHODS FOR MEASURING GEOMETRIC CHANGES OF EMBEDDED PASSIVE MATERIALS DURING A LAMINATION PROCESS

STATEMENT REGARDING FEDERALLY SPONSORED RESEARCH OR DEVELOPMENT

This invention was made with government support under Government Contract Number FA8650-06-C-5055 awarded by the United States Air Force Research Laboratory. The Government has certain rights in the invention.

BACKGROUND OF THE INVENTION

1. Statement of the Technical Field

The inventive arrangements relate to Printed Circuit Boards (PCBs) and Printed Wiring Boards (PWBs) having embedded passive materials, and more particularly to systems and method for measuring and tracking geometric changes of the embedded passive materials during a lamination process.

2. Description of the Related Art

There is a growing demand to design and manufacture smaller circuit boards having increased functionality. As such, a new circuit board technology has emerged. This circuit board technology deals with embedding passive components directly into circuit boards. This embedding is achieved by placing one or more passive components between two (2) interconnecting substrates of a circuit board. The passive components include, but are not limited to, capacitors, resistors and inductors. It should be noted that there are many benefits to embedding passive components into a circuit board. These benefits include, but are not limited to, decreased board area requirements, decreased wiring density requirements, decreased assembly costs and increased circuit performance due to shorter signal paths.

Despite the advantages of embedded passive components, the technique suffers from certain drawbacks. For example, rather large variations can occur in the value of the embedded passive components. These induced errors result from dimensional changes of the embedded passive components that occur during a lamination process. The dimensional changes include, but are not limited to, an increase in a width, length and/or thickness of the passive material. The changes in electrical characteristics of the passive components can result in undesirable circuit performance.

SUMMARY OF THE INVENTION

Embodiments of the present invention concern a method for measuring changes in geometry occurring to one or more elements formed of a material layer disposed on a first substrate when heat and pressure are applied to the material layer and the first substrate during a lamination process. The method involves several steps including forming from the material layer one or more sample pads disposed on the substrate. A multi-layer structure is formed by placing at least a second substrate panel on top of the first substrate so that the material layer is disposed between the first substrate and the second substrate. The method includes measuring with an interferometer dimensional changes occurring to the sample pad while applying heat and pressure to the multi-layer structure as part of a lamination process. At least a portion of an interferometer structure is disposed on the sample pad for performing the measuring step.

The method includes the step of securing a first optical fiber and a second optical fiber to the sample pad. The first optical fiber is axially aligned with the second optical fiber, and an end of the first optical fiber is spaced a distance from an end of the second optical fiber. The distance between the ends of the optical fibers varies as the lamination process proceeds and the material layer dimensionally deforms. The interferometer can be of any suitable type useful for measuring changes in dimensions occurring at the material layer. For example the interferometer can be a Fabry-Perot interferometer, a Michelson interferometer or a Mach-Zehnder interferometer.

The material layer is advantageously formed from a two or more stacked layers. For example, the plurality of stacked layers in some embodiments are chosen to include a metal layer and a passive component material layer. The material layer in such embodiments is used to form one or more passive electronic circuit elements disposed on the substrate. Significantly, a geometry of the passive electronic circuit element is modified in response to the measuring step described above so as to compensate for expansion and contraction of the material layer during the lamination process.

The invention also concerns a system for measuring changes in geometry occurring to elements formed of a material layer disposed on a first substrate during a lamination process. In such arrangement, a sample pad is formed from the material layer and disposed on the substrate. A second substrate panel is disposed on top of the first substrate to form a multi-layer structure with the material layer disposed between the first substrate and the second substrate. An optical measurement structure is disposed on the sample pad to form at least a portion of an interferometer. The interferometer is configured to measure dimensional changes occurring to the sample pad while applying heat and pressure to the multi-layer structure as part of the lamination process.

The optical measurement structure is advantageously formed of a first optical fiber and a second optical fiber, each fixed to the sample pad. The first optical fiber is axially aligned with the second optical fiber, and an end of the first optical fiber is spaced a distance from an end of the second optical fiber. The first optical fiber and the second optical fiber are disposed in axial alignment within a capillary tube and movable relative to each other along a common axis as the sample pad expands and contracts as part of the lamination process. In some embodiments, the system can also includes a temperature sensor configured for measuring temperature changes at the sample pad concurrently with applying the pressure and the heat to the multi-layer structure.

The material layer includes a plurality of stacked layers such as a metal layer and a passive component material layer. In some embodiments, the material layer comprises one or more passive electronic circuit element disposed on the substrate. The system also advantageously includes processing means for receiving data collected by the interferometer. The processing means is configured for determining a modified geometry passive electronic circuit element in response to the data to compensate for expansion and contraction of the material layer during the lamination process.

BRIEF DESCRIPTION OF THE DRAWINGS

Embodiments will be described with reference to the following drawing figures, in which like numerals represent like items throughout the figures, and in which:

FIGS. 3A-3D collectively provide a flow diagram of an exemplary fabrication process that is useful for understanding the present invention.

FIGS. 6A-6B show an exemplary process for forming an interferometer aperture in the circuit board panel of FIG. 4 that is useful for understanding the present invention.

DETAILED DESCRIPTION

Figure 1:
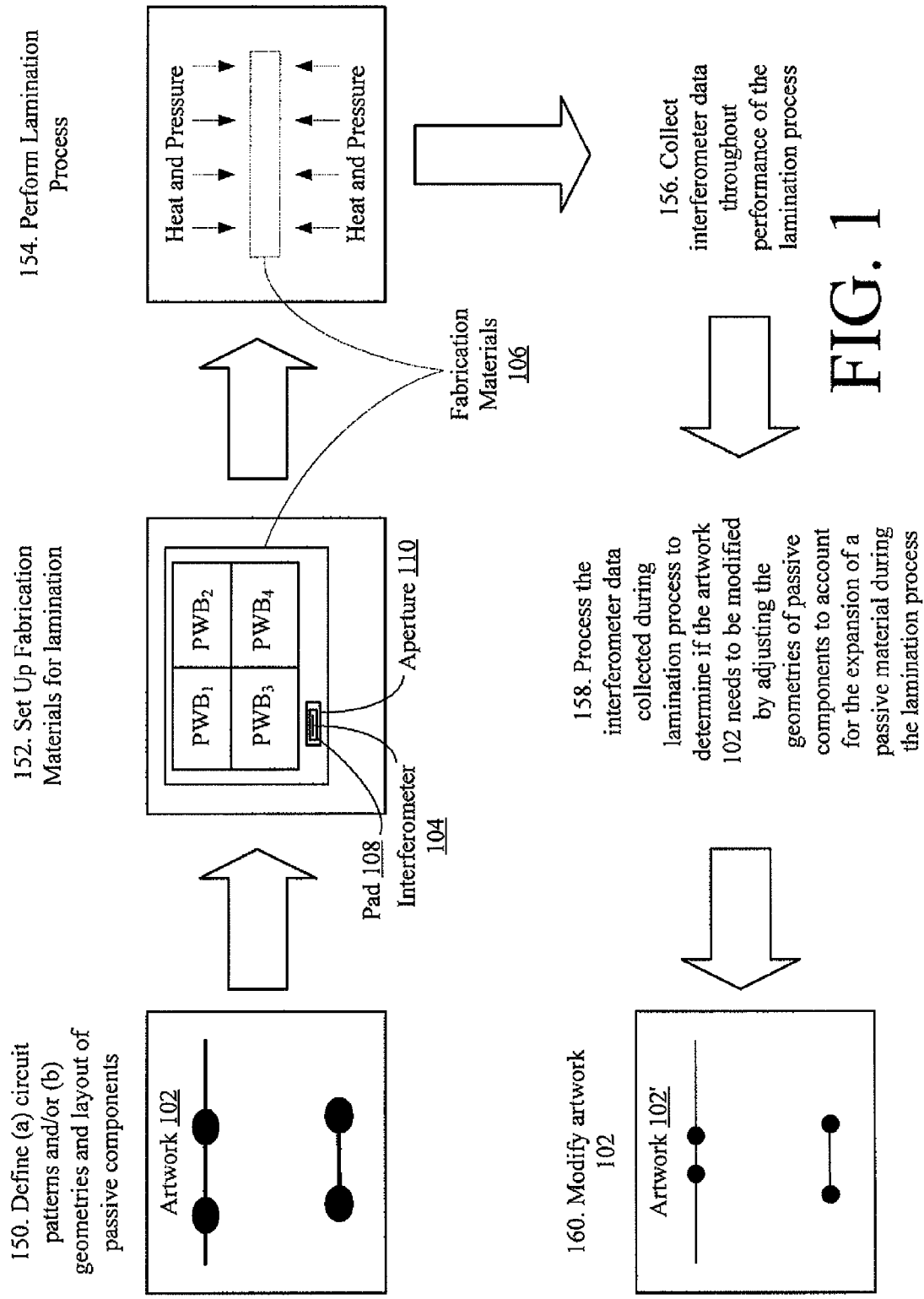
FIG. 1 is a conceptual diagram of an exemplary process for fabricating a multi-layer circuit board having embedded passive components that is useful for understanding the present invention.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention generally concern an improved method for fabricating a multi-layer circuit board having embedded passive components. Circuit boards manufactured using the present invention advantageously have embedded passive components with tolerance values less than those of embedded passive components created using conventional circuit board manufacturing methods. In order to provide the improved tolerance values for the embedded passive components, various measurements are taken during a lamination process. These measurements are then used to adjust passive component designs of a circuit board layout so as to compensate for errors that are induced during a lamination process. These errors result from the expansion and contraction of a passive material in an x, y and/or z direction during a lamination process. Accordingly, the present invention provides a way to measure and track, in real time, the expansion and contraction of a passive material in the x, y and/or z direction during a lamination process. These measurements are subsequently used to manufacture another circuit board with embedded passive components having decreased tolerances as compared to the previously manufactured board.

In this regard, it should be understood that two (2) parameters of a lamination process affect the final geometric shape of a passive component. These parameters include pressure and temperature applied to the passive component. The geometric changes of a passive component due to the applied pressure can be calculated using known equations. Notably, the pressure-induced geometric change of a passive component is relatively small because of the passive material's elastic properties. In contrast, the heat-induced geometric changes of the passive component are large as compared to the pressure-induced geometric change. As such, applied pressure has a relatively small influence on the final geometric shape of a passive component. Applied heat has a relatively large influence on the final geometric shape of a passive component.

The geometric changes of a passive component due to applied heat are non-linear around the set temperature of the lamination material (e.g., pre-preg or resin). This non-linear response of the passive material makes the final geometry of a passive component difficult to predict accurately without measuring the geometric changes of the passive component throughout a lamination process. Therefore, it is desirable to observe and measure the geometric changes of a passive component while heat is applied thereto during a lamination process. The observations and measurements of the heat-induced geometric changes can be accomplished using an interferometer.

Accordingly, the present invention utilizes one or more optical fiber interferometers to measure dimensional changes occurring in at least one sample portion of a passive material during a lamination process. Optical fiber interferometers provide measurements that are more accurate than otherwise possible using conventional post lamination measurements or end point process measurements made by humans. For example, an optical fiber Fabry-Perot interferometer can be used to quantify changes in a length and/or width of a passive material at the micron level of precision. In one instance an optical fiber Fabry-Perot interferometer was used to quantify an expansion of a sample portion of a passive material down to nineteen (19) nano-meters. The advantages of the highly accurate geometric measurements will become more evident as the discussion progresses.

Manually measuring a final shape of a passive component is difficult, time consuming and labor intensive. The present invention advantageously automates the process and thereby reduces the amount of operator time required during a circuit board fabrication process. This invention also eliminates measurement errors resulting from humans which typically occur during conventional fabrication processes. The invention also eliminates the need for technicians to enter information defining the expansion of a passive material into a computing device, which data entry is typically required in conventional circuit board fabrication techniques.

Further, in the PCB/PWB field, it is well known that multilayer circuit boards are laminated together using pre-preg. The pre-preg material is usually an epoxy resin material that has additional adhesive allowing it to adhere to the board layer above and below it in a stack of layers. Notably, conventional post lamination or end point process measurements do not provide a real-time means for measuring a set temperature of a pre-preg material. The phrase "set temperature", as used herein, refers to the temperature at which the pre-preg material cures and stops flowing. The set temperatures of pre-preg materials is known to vary slightly based on the age and set life of the material at the time of lamination. As such, the set temperature will be slightly different for each lot or package of pre-preg material. The interferometer of the present invention provides a means for measuring the set temperature of a pre-preg material. The set temperature of the pre-preg material can then be used for real-time quality control purposes. For example, if the temperature ramping of a lamination process changes beyond a desired profile, then data defining said changes will be fed back to a technician. The technician can use this data to adjust or repair a lamination machine so that the temperature ramping of a next iteration of a lamination process will not change beyond the desired profile.

Referring now to FIG. 1, there is provided a conceptual diagram of an exemplary fabrication process that is useful for understanding the present invention. The fabrication process involves six (6) main steps 150-160.

In step 150, a person (e.g., an engineer, technician or fabricator) creates circuit board layout artwork 102 using a computing device (e.g., a personal computer) running a PCB/PWB design software program, such as a Computer Aided Design (CAD) tool. The PCB/PWB design software programs are well known to those having ordinary skill in the art, and therefore will not be described herein. However, it should be understood that the PCB/PWB design software program can include any suitable software program known to those skilled in the art. The artwork 102 is created by defining a circuit pattern that is to be disposed or formed on a circuit board panel of a multi-layer circuit board. The artwork 102 is also created by defining geometries and layouts of passive components that are to be formed on a passive material panel of a multi-layer circuit board. The passive components, circuit board panel and passive material panel will be described in detail below.

After creating the artwork 102, fabrication materials 106 are set up for lamination in step 152. This step involves creating passive components (not shown in FIG. 1) from a material layer disposed on a substrate. This step also includes forming at least one sample pad 108 from the same material layer. The material layer includes one or more stacked layers of material necessary for forming a passive component. For example, the material layer in some embodiments includes a passive material layer disposed on the substrate, and a metal layer disposed over the passive material layer.

Each sample pad 108 provides a useful platform on which to measure geometric changes occurring during a lamination process with respect to passive components formed in the material layer. Geometric changes occurring with respect to one or more sample pads are indicative of the geometric changes occurring with respect to passive components disposed elsewhere on a substrate panel. Notably, each sample pad 108 is formed on the substrate at a location which will not interfere with a circuit pattern and electronic components of a PCB/PWB.

Step 152 also involves attaching at least one interferometer 104 to the sample pad 108. The attachment of the interferometer 104 to the sample pad 108 can be achieved via a glue or other known adhesive that can withstand high temperatures. Notably, adhesion of the interferometer 104 to metal (e.g., copper) is easier than it is to a passive material (e.g., Teflon). The metal layer (e.g., copper) is bonded to the passive material layer and has a Coefficient of Thermal Expansion (CTE) substantially similar to that of the passive material. Accordingly, it will expand and contract during a lamination process at the same rate as the passive materiel. As such, accurate measurements of geometric changes of the passive material can be obtained by attachment of the interferometer 104 to the metal layer. Still it should be appreciated that the present invention can be implemented by attaching an interferometer 104 directly to a passive material layer (when possible) or indirectly to the passive material via a metal layer.

Step 152 may further involve forming an aperture 110 in at least one circuit board panel. For example, the aperture 110 will be formed if a Fabry-Perot interferometer is employed. In contrast, the aperture 110 will not be formed if a Michelson interferometer and/or a Mach-Zehnder interferometer is employed. Each type of interferometer will be described in detail below. Generally, the aperture 110 ensures that a lamination material (e.g., a pre-preg material) will not interfere with the operation of the interferometer 104. This feature of the aperture 110 will become more evident as the discussion progresses.

Thereafter, the fabrication materials 106 are assembled by stacking layers of circuit board panels, substrate panels, bonding agents, release agents and/or vacuum bag materials. For example, the circuit board panel is stacked above the passive material such that the aperture 110 is aligned with the sample pad 108. Notably, the aperture 110 is larger than the sample pad 108. In effect, the circuit board panel will not interfere with the operation of the interferometer 104. More particularly, the circuit board panel will not restrict the movement of a portion of the interferometer 104 as a passive material expands and contracts during a lamination process. Also, the aperture 110 ensures that the interferometer 104 will not be immovably embedded between the circuit board panel and the substrate panel.

Next, the interferometer 104 is coupled to a measurement system configured to collect time data, temperature data and passive material data. The data can be obtained using the interferometer 104. The temperature data can be obtained using the interferometer 104, a thermocoupler and/or sensor. The time, temperature and passive material data can be stored in a database for subsequent use in an analysis process. The analysis process can generally involve using the time and temperature data to track temperature changes that occur during a lamination process. The passive material data defines the expansion and contraction of the passive material in an x, y and/or z direction during the lamination process. The analysis process can also involve using the time and passive material data to track the expansion and contraction of the passive material during the lamination process. The measurement system will be described in detail below in relation to FIG. 2.

In step 154, the fabrication materials 106 are placed in a lamination device (not shown in FIG. 1). The lamination device (not shown in FIG. 1) performs a lamination process to form the multi-layer circuit board having embedded passive components. The lamination process involves applying heat and pressure to the fabrication materials 106 for a predetermined period of time. The amount of heat applied to the fabrication materials 106 depends on the type of substrate material selected to form the multi-layer circuit board. For example, a PolyTetraFluoroEthylene (PTFE) substrate material typically requires a higher temperature then a Flame Retardant 4 (FR-4) substrate material for purposes of creating a multi-layer circuit board.

During the lamination process, the passive material forming the passive component(s) expand(s) in an x, y and/or z direction. The amount of expansion of the passive material in an x, y and/or z direction may vary with the type of substrate material selected to form the multi-layer circuit board. For example, a passive material disposed on a PTFE substrate material will expand in the x, y and/or z direction differently than a passive material disposed on a FR-4 weaved substrate material. After completion of the lamination process, the passive component will not return to its shape as originally designed. The lamination device (not shown in FIG. 1) will be described in detail below in relation to FIG. 2.

Notably, dimensional changes of a passive component in the x and y directions affect the aspect ratio of the embedded passive component, and therefore affect the final or desired electrical value of the passive component. For example, the final or desired electrical value of a passive component is defined by mathematical equations (1) through (3).

$$R = \rho s \cdot (L/W) \quad (1)$$

$$\rho s = \rho/t \quad (2)$$

$$V = L \cdot W \cdot H \quad (3)$$

where R represents the final or desired electrical value of the resistive material. $\rho s$ represents a sheet resistance of a passive material panel measured in Ohms per square. L represents the length of the passive component measured in mils. W represents the width of the passive component measured in mils. $\rho$ represents a resistance of the resistive material. t represents the thickness of the resistive material. V represents a fixed volume of a passive component. H represents the height of the passive component or the thickness t of the passive material.

Notably, a change in the height H of the passive component or thickness t of the passive material is inversely proportional to the final electrical value of the desired resistance. For example, if the thickness t of a passive material is 0.25 microns and a sheet resistance is 25 Ohms per square, then the resistivity of the resistive material is $6.2 \cdot 10^{-6}$ Ohms per meter as evident from mathematical equation (2). During a lamination process, the height H of the passive component or thickness t of the resistive material changed from 0.25 microns to 0.23 microns. In this scenario, the sheet resistance changes from 25 Ohms per square to 26.88 Ohms per square. Embodiments of the present invention are not limited in this regard.

During the lamination process, the interferometer data and/or other sensor data is collected in step 156. The collected data is processed in step 158 to determine the geometric change of at least one passive material pad in an x, y and/or z direction. Thereafter, the determined geometric changes are used in step 160 to modify the artwork 102 so as to account for the expansion of the passive material during the lamination process. In effect, the tolerances of the passive components formed in a next multi-layer circuit board are reduced as compared to the passive components of a previously manufactured circuit board. The modified artwork is identified in FIG. 1 with reference number 102'.

The above described fabrication process overcomes certain drawbacks of conventional processes for fabricating a circuit board including embedded passive components. For example, the present invention provides a way to measure the final passive component shape, which has not previously been possible. In this regard, it should be understood that a direct measurement of the final passive component shape is not possible because the passive components are embedded in the multi-layer circuit board.

Also, the multilayer circuit board fabricated using the above described process has a high circuit performance as compared to multi-layer circuit boards manufactured using conventional PCB/PWB fabrication techniques. In this regard, it should be understood that this improved circuit performance is partially a consequence of the utilization of the interferometer to track the expansion and contraction of passive materials during a lamination process. The quantification of the expansion of the passive material provides a means to form embedded passive components with tighter tolerances (e.g., 3% or 5%) as compared to the tolerances (e.g., 25%) of conventional passive components. The passive components with tighter tolerances (e.g., 3% or 5%) can be provided regardless of the type of passive material and/or substrate material selected to form a multi-layer circuit board.

Furthermore, the interferometer facilitates an instantaneous feedback of the expansion of a passive material during a lamination process. This instantaneous feedback feature of the present invention provides a circuit board fabrication process with a decreased duration as compared to that of conventional fabrication processes. This instantaneous feedback feature of the present invention also provides a circuit board fabrication process with a higher yield and a decreased cost as compared to that of conventional fabrication processes. In this regard, it should be understood that the conventional fabrication methods may measure the final electrical value of the passive component and adjust the artwork based on the measured value. However, this process requires the following additional steps: (a) forming vias in the multi-layer circuit board; (b) filling the vias with a conductive material; and (c) measuring the resistance of an embedded passive component. As such, this conventional fabrication method is more time consuming and costly than the fabrication method of the present invention. Also, the conventional fabrication method provides embedded passive components with relatively high tolerances (e.g., 25%) as compared to the embedded passive components of the present invention.

Exemplary System Implementing the Present Invention

It should be noted that the present invention will be described in more below with reference to FIGS. 2-14. FIGS. 2-14 illustrate an implementation of the above described fabrication process in a Fabry-Perot interferometer based system. Embodiments of the present invention are not limited in this regard. For example, a Michelson interferometer based system or a Mach-Zehnder interferometer based system can be used in addition to or alternatively to the Fabry-Perot interferometer. A schematic illustration of an exemplary Michelson interferometer based system is provided in FIG. 15. A schematic illustration of an exemplary Mach-Zehnder interferometer based system is provided in FIG. 16.

An exemplary Fabry-Perot interferometer based system 200 implementing the above described process will now be described in relation to FIGS. 2-14. The objective of the system 200 is to enable a person (e.g., an engineer, technician or fabricator) or an entity (e.g., PCB/PWB manufacturing house) to manufacture a multi-layer circuit board with embedded passive components having desirable component parameters (e.g., resistance, capacitance and/or inductance) regardless of errors induced during a lamination process. As noted above, these induced errors can cause rather large variations in the final values of the embedded passive components.

Figure 2:
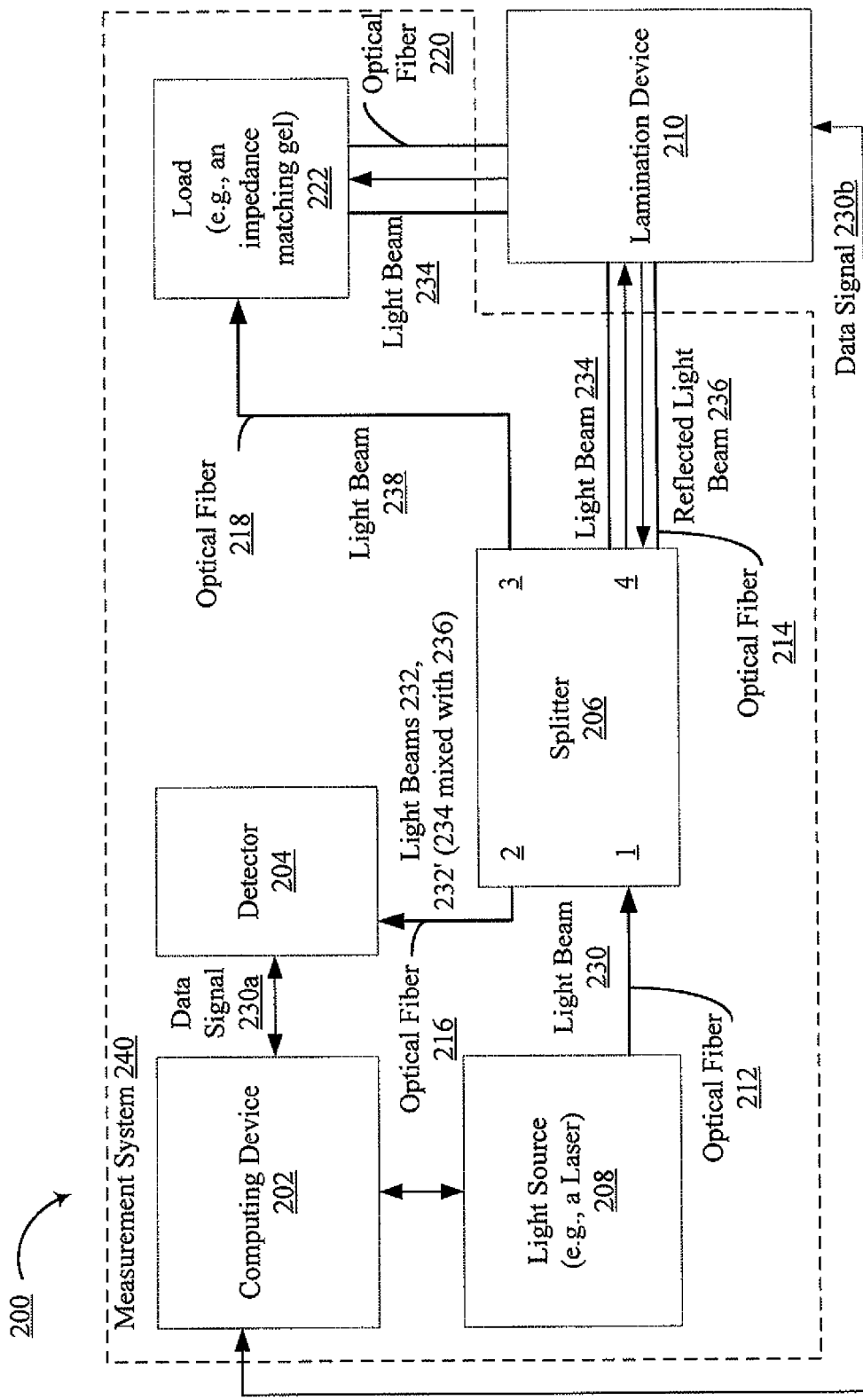
FIG. 2 is a block diagram of an exemplary system for fabricating a circuit board including embedded passive components.

As shown in FIG. 2, the system 200 comprises a lamination device 210 coupled to a measurement system 240. The lamination device 210 includes, but is not limited to, a printed circuit board laminating machine or autoclave. Printed circuit board laminating machines and autoclaves are well known to those having ordinary skill in the art, and therefore will not be described in detail herein.

However, it should be understood that the lamination device 210 generally performs laminating operations for forming the multi-layer circuit board. The laminating operations generally involve using pressure, heat and/or vacuum for laminating circuit board panels and passive material panels together. Accordingly, the lamination device 210 includes pressure plates (not shown in FIG. 2), a heater element (not shown in FIG. 2) and/or a vacuum (not shown in FIG. 2). The heater element (not shown in FIG. 2) may include a plurality of strip heaters mounted to or embedded in the pressure plates (not shown in FIG. 2). Additionally or alternatively, the heater element (not shown in FIG. 2) may include a heater blanket.

The purpose of the measurement system 240 is to measure the dimensional changes that occur in a passive component in one or more directions (e.g., an x, y and/or z direction) during the lamination operations performed by the lamination device 210. Notably, a desired final geometry of at least one passive component is defined prior to the performance of the lamination operations by the lamination device 210. As noted above, the lamination operations involve applying temperature and pressure to fabrication materials (not shown in FIG. 2) for a predetermined period of time (e.g., 3 hours). The temperature and pressure are increased and decreased during the predetermined period of time. In addition, a vacuum can be placed on the fabrication materials (not shown in FIG. 2). The temperature, pressure and/or vacuum changes the final geometry of the original designed passive component. As such, the measurement system 240 is generally configured to provide information that can be used to selectively modify the geometry of the passive component so as to account for the dimensional changes thereof that occur during a lamination process. Notably, the geometry of the passive component can be selectively modified manually by a person (e.g., an engineer, fabricator or operator) or automatically by a processing device (e.g., a processor). As noted above, there are various benefits to an automated modification of passive component layout designs. For example, an automated modification of passive component layout designs eliminates human errors and decreases hands-on-time by a person (e.g., an engineer, fabricator or operator). The selective modification can be based on data collected that defines the expansion and contraction of the passive material in one or more directions (e.g., an x, y and/or z direction) which occurs during the lamination operations.

As shown in FIG. 2, the measurement system 240 comprises a computing device 202, a detector 204, a splitter 206, a laser light source 208, a plurality of optical fibers 212, 214, 216, 218, 220 and a load 222. Each of the optical fibers 212, 214, 216, 218, 220 can include, but is not limited to, a single mode fiber. The single mode fiber can be configured to withstand extreme temperatures (e.g., 400° Fahrenheit) and/or pressures (e.g., 300 Pounds per Square Inch) applied thereto. The load 222 can include, but is not limited to an impedance matching gel configured to absorb light energy from optical fibers coupled thereto. Embodiments of the present invention are not limited to the measurement system architecture shown in FIG. 2. For example, the measurement system 240 can include more or less components than those shown in FIG. 2.

Generally, the computing device 202 can be a workstation computer, a personal computer, a multiprocessor system, a microprocessor-based or programmable consumer electronic and/or the like. As such, the computing device 202 may range widely in terms of capabilities and features. Suitable software can be loaded into memory of the computing device. For example, such software can include LABVIEW®, which is available from National Instruments of Austin, Tex., for data acquisition, instrument control and industrial automation. The data acquisition can involve, but is not limited to, collecting and relating data in graph and/or tabular forms. In this scenario, the computing device 202 controls the light source 208, lamination device 210 and/or detector 204.

The computing device 202 can be utilized by an engineer and/or a PCB/PWB fabricator. As such, suitable PCB/PWB design and layout application software can also be installed thereon. The PCB/PWB design and layout application software can be selected to enable user-software interactions for creating PCB/PWB artwork. More particularly, the PCB/PWB design and layout application software enables user-software interactions for defining a circuit pattern that is to be disposed or formed on a circuit board panel of a multi-layer circuit board. The PCB/PWB design and layout application software also enables user-software interactions for defining geometries and layouts of passive components that are to be formed on a passive material panel of a multi-layer circuit board.

The computing device 202 is operative to receive data signals 230a from the detector 204 and/or data signal 230b from the lamination device 210. The data signals 230a, 230b can include temperature information used by the computing device 202 to track temperature changes of fabrication materials (not shown in FIG. 2) that occur during a lamination process. The temperature changes can be measured using an interferometer, a thermocoupler (not shown in FIG. 2) and/or a temperature sensor (not shown in FIG. 2). Thermocouplers and temperature sensors are well known to those having ordinary skill in the art, and therefore will not be described herein.

The data signals 230a, 230b also include passive material information that defines the expansion and contraction of the passive material in an x, y and/or z direction during the lamination process. The passive material information is used by the computing device 202 to track the expansion and contraction of at least one sample of passive material during the lamination process. The passive material information can be obtained using an optical fiber interferometer (not shown in FIG. 2). The optical fiber interferometer will be described in detail below. However, it should be understood that the optical fiber interferometer (not shown in FIG. 2) can include optical fibers 214, 220.

Generally, the light source 208 includes a laser configured to transmit laser energy at a power level. The power level is selected based on the collective length of the optical fibers 214, 220 and a gap formed therebetween. As shown in FIG. 2, a light beam 230 emitted from the light source 208 propagates through an optical fiber 212 towards an input port 1 of the splitter 206. The light beam 230 can have a particular wavelength selected in accordance with a particular application. For example, in some embodiments of the present invention, the light beam 230 has a 1550 nm wavelength. The splitter 206 couples part of the light beam 230 by an equal amount out through output ports 2, 3 and 4. In particular, the light beam 230 is split into three (3) equal light beams 232, 234, 238 with a certain amount of power loss. The light beam 232 propagates along the optical fiber 216 towards the detector 204. The light beam 238 propagates along the optical fiber 218 towards the load 222. The light beam 234 propagates along optical fiber 214 towards the load 222. The light beam 234 is coupled from the optical fiber 214 to the optical fiber 220. The light beam 234 travels along the optical fiber 220 towards the load 222. As noted above, the load 222 can include an impedance matching gel. The impedance matching gel prevents reflected power from being input into the port 3 of the splitter 206. The impedance matching gel also prevents reflected power from interfering with a reflected light beam 236 (described below). As shown in FIG. 2, the reflected light beam 236 travels along the optical fiber 214 towards the splitter 206.

As noted above, the optical fibers 214, 220 form an interferometer (not shown in FIG. 2) configured to measure variations in the geometry of a passive component. The structure of the interferometer (not shown in FIG. 2) will become more evident as the discussion progresses. However, it should be understood that various types of interferometers can be used for this purpose. For example, the interferometer can be a Fabry-Perot interferometer (described below in relation to FIGS. 7-9 and 13A-13E), a Michelson interferometer (described below in relation to FIG. 15) or a Mach-Zehnder interferometer (described below in relation to FIG. 16). A Fabry-Perot interferometer can be used to determine the real-time expansion of a passive material during a lamination process in one direction (e.g., the y direction). As such, a plurality of Fabry-Perot interferometers can be used to determine the real-time expansion of a passive material during a lamination process in two or more directions (e.g., the x and y directions). However, Fabry-Perot interferometers can not measure the real-time expansion of a passive material in the z direction (i.e., a change in thickness thereof). In contrast, a single Michelson interferometer and a single Mach-Zehnder interferometer can be used to determine the real-time expansion of a passive material during a lamination process in a plurality of directions (i.e., the x, y and z directions). Notably, the Michelson and Mach-Zehnder interferometers can measure the real-time expansion of a passive material in the z direction (i.e., a change in thickness thereof). This "z" measurement is achieved by applying a pressure on a circuit board having the Michelson or Mach-Zehnder interferometer disposed therein. As the pressure applied to the circuit board is increased, at least a portion of the Michelson or Mach-Zehnder interferometer (i.e., an optical fiber) will deform. The amount of deformity is directly related to the change in the "z" dimension or thickness of the passive material due to the pressure. The Michelson or Mach-Zehnder interferometer will be described in more detail below in relation to FIGS. 15-16.

In some embodiments of the present invention, the interferometer can be configured to measure variations in the geometry of a passive material on the order of tens of nanometers. The interferometer can also be used to determine the temperature applied to fabrication materials during the lamination process. Accordingly, the interferometer (not shown in FIG. 2) is coupled to a pad formed on a passive material panel of the fabrication materials. The coupling of the interferometer (not shown in FIG. 2) to the pad may be achieved using a glue or other adhesive that can withstand high temperatures. An exemplary manner in which the interferometer (not shown in FIG. 2) is coupled to a pad will be described below.

As shown in FIG. 2, a reflected light beam 236 propagates along optical fiber 214 towards splitter 206. Notably, the light beams 234, 236 have the same or substantially similar frequencies. When the light beams 234, 236 have the same frequency, the resulting pattern or light beam 232' is determined by the phase difference therebetween. In this regard, it should be understood that waves that are in phase will undergo constructive interference. In contrast, waves that are out of phase will undergo destructive interference.

Light beam 232' propagates along optical fiber 216 towards the detector 204. The detector 204 is configured to convert the amplitude of the light beam 232' into voltage values. The voltage values are communicated from the detector 204 to the computing device 202 via data signal 230a. Notably, in this scenario, the data signal 230a has varying voltage values (similar to a sinusoidal signal). The varying voltage values of the data signal 230a represent the phase differences between the light beams 234 and 236 resulting from the changes in the gap formed between the optical fibers 214, 220.

At the computing device 202, the voltage values are processed to determine if the PCB/PWB artwork needs to be modified to reduce the tolerances of the actual electrical values of the passive components formed in the multi-layer circuit board. This processing can involve generating a time domain graph by plotting voltage values verse time values. The processing can also involve counting a number of fringes or oscillations shown in the time domain graph. Thereafter, the distance changes of the length, width and/or height of at least one sample of a passive material is determined using one of the following mathematical equations (4) or (5).

$$Nf=(2 \cdot D)/\lambda \quad (4)$$

where Nf represents the total number of fringes or oscillations shown in the time domain graph. D represents to the distance change of the length, width and/or height of a sample of a passive material in nanometers. $\lambda$ represents the wavelength of a light beam supplied by a light source.

$$D=Nf_{increase}-Nf_{decrease} \quad (5)$$

where $Nf_{increase}$ represents the total number of fringes or oscillations shown in the time domain graph which correspond with an increase of temperature or an expansion of a passive material. $Nf_{decrease}$ represents the total number of fringes or oscillations shown in the time domain graph which correspond with an decrease of temperature or contraction of a passive material.

The computed distance change D is used to modify the PCB/PWB artwork. The PCB/PWB artwork is modified by adjusting the geometries of the passive components so as to account for the expansion of the passive material during the lamination process. The PCB/PWB artwork can be modified automatically or manually using the PCB/PWB design and layout application software running on the computing device 202. As noted above, there are various benefits to the automated modification of a PCB/PWB artwork. For example, an automated modification of a PCB/PWB artwork eliminates human error.

Referring now to FIGS. 3A-3D, there is provided a flow diagram of an exemplary fabrication process 300 performed using the system 200 described above. One purpose of the fabrication process 300 is to measure the expansion of a passive material in one or more directions (e.g., an x, y and/or z direction) during a lamination process.

Figure 3A:
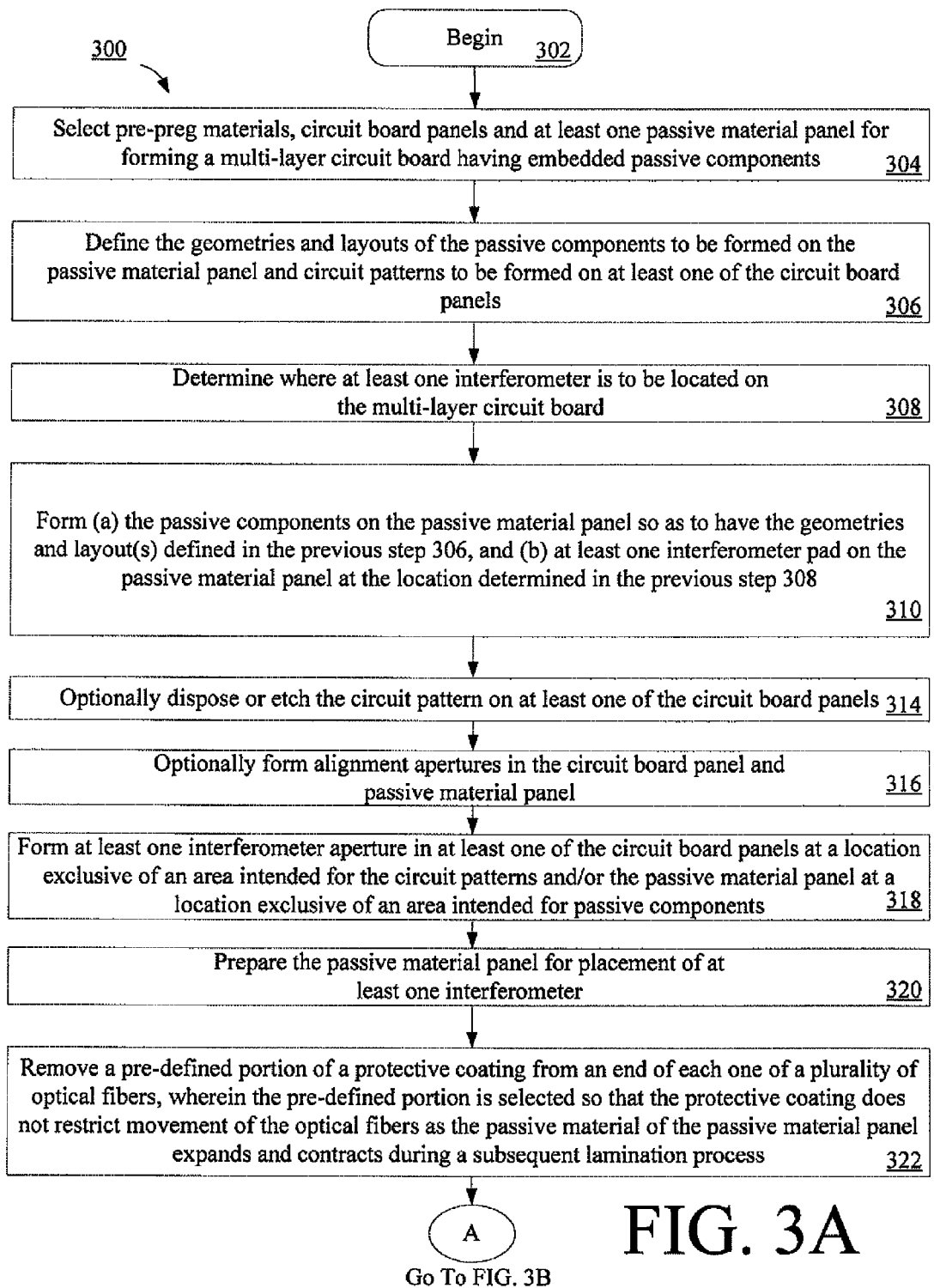

As shown in FIG. 3A, the fabrication process 300 begins with step 302 and continues with step 304. In step 304, prepreg materials, circuit board panels and at least one passive material panel are selected for forming a multi-layer circuit board having embedded passive components. The pre-preg material includes a resin suitable for laminating the circuit board panels and passive material panels together. The invention is not limited in this regard. For example, other bonding materials (e.g., a glue) can be used alternatively or in addition to the pre-preg material. The circuit board panels can include a single layer clad circuit board material, a single layer unclad circuit board material, a multi-layer (or laminate) clad circuit board material or a multi-layer (or laminate) unclad circuit board material. The passive material panel can include a single layer clad passive material or a multi-layer (or laminate) clad passive material.

Figure 4:
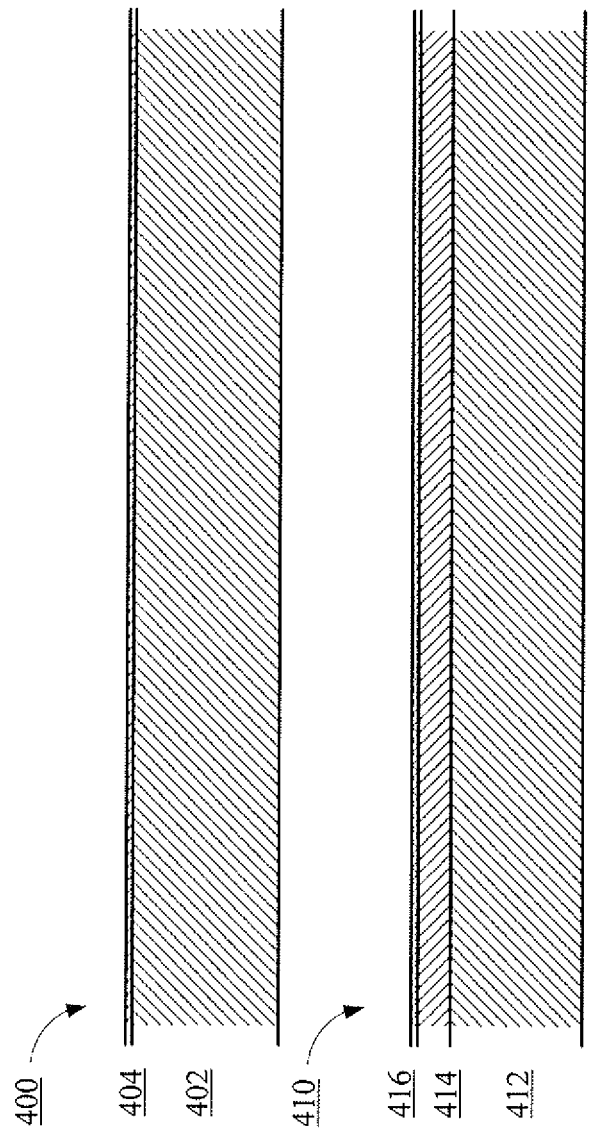
FIG. 4 provides schematic illustrations of a circuit board panel and a passive material panel that is useful for understanding the present invention.

Schematic illustrations of an exemplary circuit board panel and an exemplary passive material panel is provided in FIG. 4. As shown in FIG. 4, the circuit board panel 400 includes a substrate formed from a layer of a dielectric material 402 and a layer of a conductive metal material 404 (e.g., copper). The dielectric layer 402 comprises a woven glass material, a non-woven glass material or any other dielectric material known in the art.

The passive material panel 410 includes a substrate layer comprised of a dielectric material 412, and at least one material layers that is used to form passive components. The material layer in one embodiment is formed of a layer of a passive material 414 and a layer of a conductive metal material 416 (e.g., copper). Layer 412 comprises a woven glass material, a non-woven glass material or any other dielectric material known in the art. Layer 414 comprises a passive material suitable for fabricating resistors ("a resistor material) or capacitors ("a capacitor material"). The resistor material can include a metal thin film on a copper foil, a polymer thick film, a ceramic thick film or the like. The capacitor material can include, but is not limited to, a polyimide, a proprietary dielectric, an epoxy, a ceramic thick film or a photopolymer. Inductors can be formed on the layer 414 by forming traces in the conductive metal layer 416.

After selecting the materials for forming the multi-layer circuit board, step 306 is performed where a multi-layer circuit board layout is defined. Step 306 involves defining geometries and layouts of passive components to be formed on the passive material panel 410 of a multi-layer circuit board. Step 306 also involves defining circuit patterns to be formed on at least one circuit board panel 400 of a multi-layer circuit board. The circuit patterns, passive component geometries and passive component layouts can be designed using the computing device 202 of FIG. 2. More particularly, the passive component geometries, passive component layouts and circuit patterns for a multi-layer circuit board can be created using a CAD tool. CAD tools are well known to those skilled in the art, and therefore will not be described herein. However, it should be appreciated that any such CAD tool can be used without limitation. In this regard, step 306 can also involve storing information defining the passive component designs and circuit pattern designs in one or more data files. Step 306 can further involve adding embedded passive components to a component library so that the passive components can be added to a multi-layer circuit board layout. As used herein, the term "layout" refers to any representation that is useful for defining an arrangement or placement of electrical components and traces which will be formed on at least one layer of a multi-layer circuit board. Buried and through via locations can also be defined on the multi-layer circuit board layout. Buried and through vias are well known to those skilled in the art, and therefore will not be described herein.

Notably, the multi-layer circuit board layout is arranged to allow for a change in geometry of embedded passive components during a subsequent step of the fabrication process 300. These geometry changes can include modifying widths and/or lengths of the embedded passive components. Thus, sufficient area is preferably provided surrounding the location of each passive component so that such geometry changes do not cause the need for other layout changes. In this regard, a suitable buffer zone can be defined around each passive component included in the multi-layer circuit board layout so as to accommodate such geometry changes.

Referring again to FIG. 3A, the fabrication process 300 continues with step 308. In step 308, it is determined where at least one interferometer is to be located on the multi-layer circuit board. The interferometer can reside on any passive material layer of the multi-layer circuit board. However, the interferometer should reside at a location on the passive material layer exclusive of an area intended for a circuit pattern and/or an embedded passive component.

Next, step 310 is performed. In step 310, at least one passive component is formed on at least one passive material panel 410 so as to have the geometries and layout defined in the previous step 306. The passive component can be a resistor, capacitor or inductor. Processes for forming a passive component on a passive material panel are well known to those having ordinary skill in the art, and therefore will not be described herein. However, it should be understood that any know process for forming a passive component on a passive material panel can be used without limitation.

Figure 5:
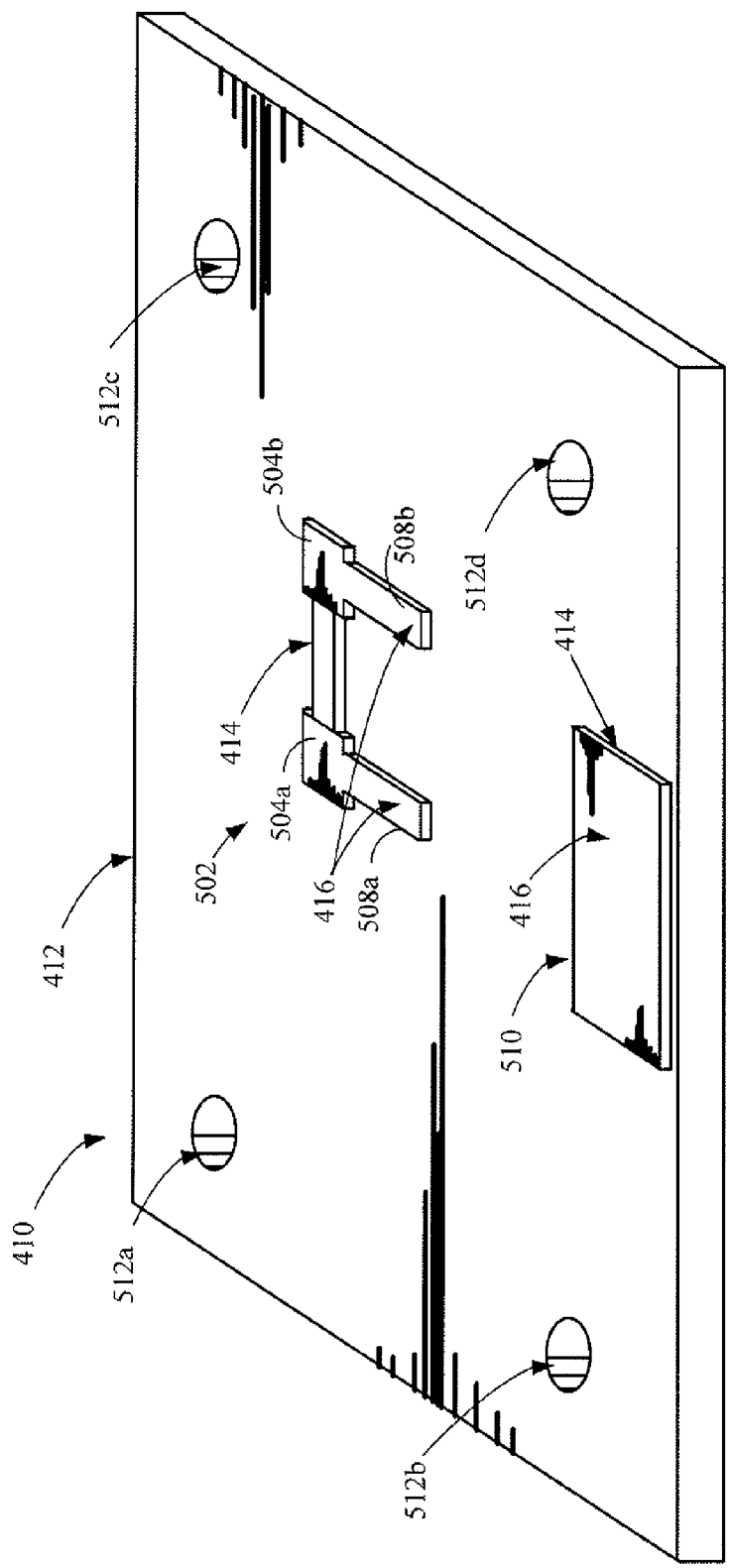
FIG. 5 is a schematic illustration of a passive component, sample pad and alignment structures formed on a passive material panel that is useful for understanding the present invention.

A schematic illustration of an exemplary passive component 502 formed on a passive material panel is shown in FIG. 5. As shown in FIG. 5, circuit traces 508a, 508b and electrical contacts 504a, 504b for a passive component 502 are defined. A portion has been removed from the conductive metal layer 416 to define a body portion 510 of the passive material 414. The geometry (i.e., shape, length and width) of the body portion 510 will define the component value of the passive component 502. It will be appreciated that the size and shape of the exposed passive component material can affect the resistance, capacitance or inductance of the passive component 502.

Referring again to FIG. 3A, step 310 also involves forming at least one sample pad on the passive material panel 410 at the location determined in the previous step 308. Processes for forming a pad on a passive material panel are well known to those having ordinary skill in the art, and therefore will not be described herein. However, it should be understood that any know process for forming a pad on a passive material panel can be used without limitation.

A schematic illustration of an exemplary sample pad 510 formed on a passive material panel is shown in FIG. 5. As shown in FIG. 5, sample pad 510 is defined so as to include a layer of passive material 414 and a layer of conductive material 416. Embodiments of the present invention are not limited in this regard. For example, the sample pad 510 can be absent of the conductive material 416. However, as noted above, there are various benefits to the inclusion of the conductive material 416 on the pad 510. For example, adhesion of an interferometer to metal (e.g., copper) is easier than it is to a passive material (e.g., Teflon). Other benefits will become evident as the discussion progresses. The sample pad 510 has dimensions (i.e., a length and a width) selected in accordance with a particular fabrication application. For example, the sample pad 510 has a length $L_2$ of three (3) inches and a width of one (1) inch. Embodiments of the present invention are not limited in this regard.

Referring again to FIG. 3A, the fabrication process 300 continues with optional step 314. In step 314, a circuit pattern is optionally disposed or etched on at least one circuit board panel. Thereafter, optional step 316 is performed where alignment apertures are formed in the circuit board panel(s) and passive material panel(s). The alignment apertures are formed in the panels using any means known in the art, such as a drilling means or a hole punching means. The alignment apertures are sized and shaped for receiving optional alignment structures (e.g., pins or posts). A schematic illustration of the passive material panel 410 having alignment apertures 512a, 512b, 512c, 512d formed therein is shown in FIG. 5. The having alignment apertures 512a, 512b, 512c, 512d ensure that an interferometer aperture (described below in relation to step 318) formed on at least one circuit board panel will align with aligned with the pad 510.

Upon completing optional step 316, step 318 is performed where at least one interferometer aperture is formed in at least one circuit board panel and/or at least one passive material panel at predefined locations. The predefined locations are locations of a multi-layer circuit board exclusive of an area intended for circuit patterns and/or embedded passive components.

The process for forming an interferometer aperture in a circuit board panel 400 is illustrated in FIGS. 6A-6B. The process begins by drilling or punching an aperture through the dielectric layer 402 and conductive metal layer 404 of the circuit board panel 400. The results of this drilling or punching are illustrated in FIGS. 6A-6B. As shown in FIGS. 6A-6B, an interferometer aperture 602 is defined. The interferometer aperture 602 has dimensions (i.e., a length $L_3$ and a width $W_3$) selected in accordance with a particular fabrication application. For example, the interferometer aperture 602 has a length $L_3$ of three and a half (3.5) inches and a width $W_3$ of one and a quart (1.25) inches. Notably, the size of the interferometer aperture 602 is larger than the sample pad 510. As such, the interferometer aperture 602 ensures that the circuit board panel 400 will not restrict the movement of a portion of an interferometer as a passive material expands and contracts during a lamination process. Also, the aperture 602 ensures that the interferometer will not be immovably embedded within a multi-layer circuit board. Embodiments of the present invention are not limited in this regard.

Referring again to FIG. 3A, the fabrication process 300 continues with step 320. In step 320, the passive material panel 410 is prepared for placement of the at least one interferometer. This step 320 can involve cleaning oils and dirt from the surfaces of the passive material panel 410. Thereafter, steps 322 of FIG. 3A and steps 324, 326 of FIG. 3B are performed for forming an interferometer.

Figure 7:
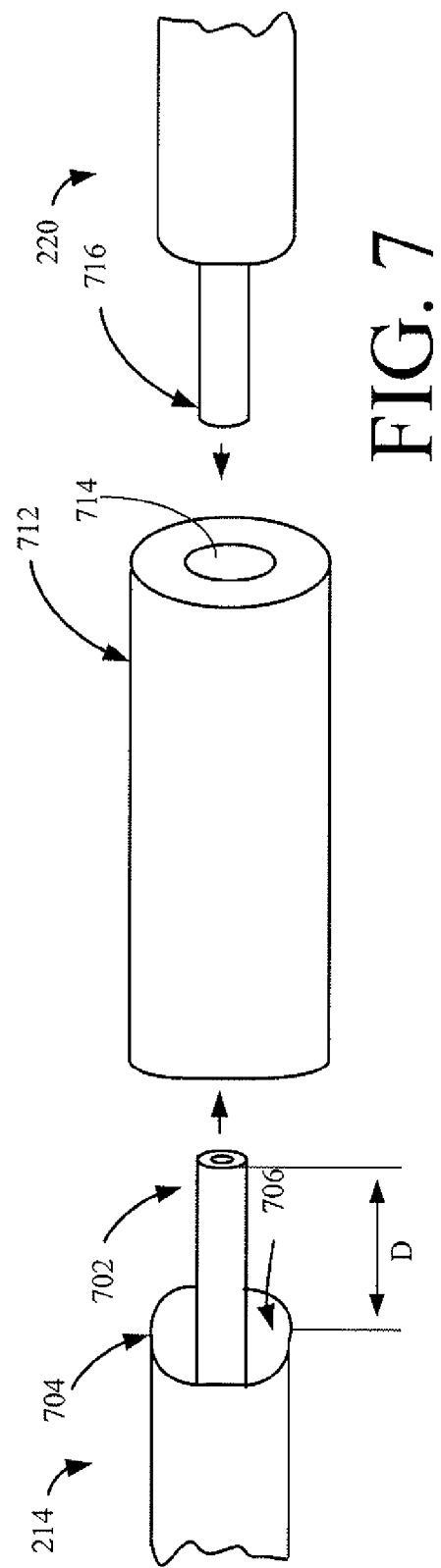
FIG. 7 shows an exemplary process for making an interferometer that is useful for understanding the present invention.

Step 322 involves removing a pre-defined portion of a protective coating from an end of each one of the optical fibers 214, 220. The protective coating provides mechanical strength to the optical fibers 214, 220. The protective coating is formed of a material (e.g., copper) that ensures the optical fibers 214, 220 can withstand high temperatures and pressures. A schematic illustration of an optical fiber 214 with a pre-defined portion of a protective coating 706 removed therefrom is shown in FIG. 7. The pre-defined portion has a length defined by the distance D from an end 702 of the optical fiber 214 to a location 704 along the optical fiber 214. According to one embodiment of the present invention, the distance D is selected to be approximately one (1) inch. Still, it should be understood that the invention is not limited in this regard.

Figure 3B:
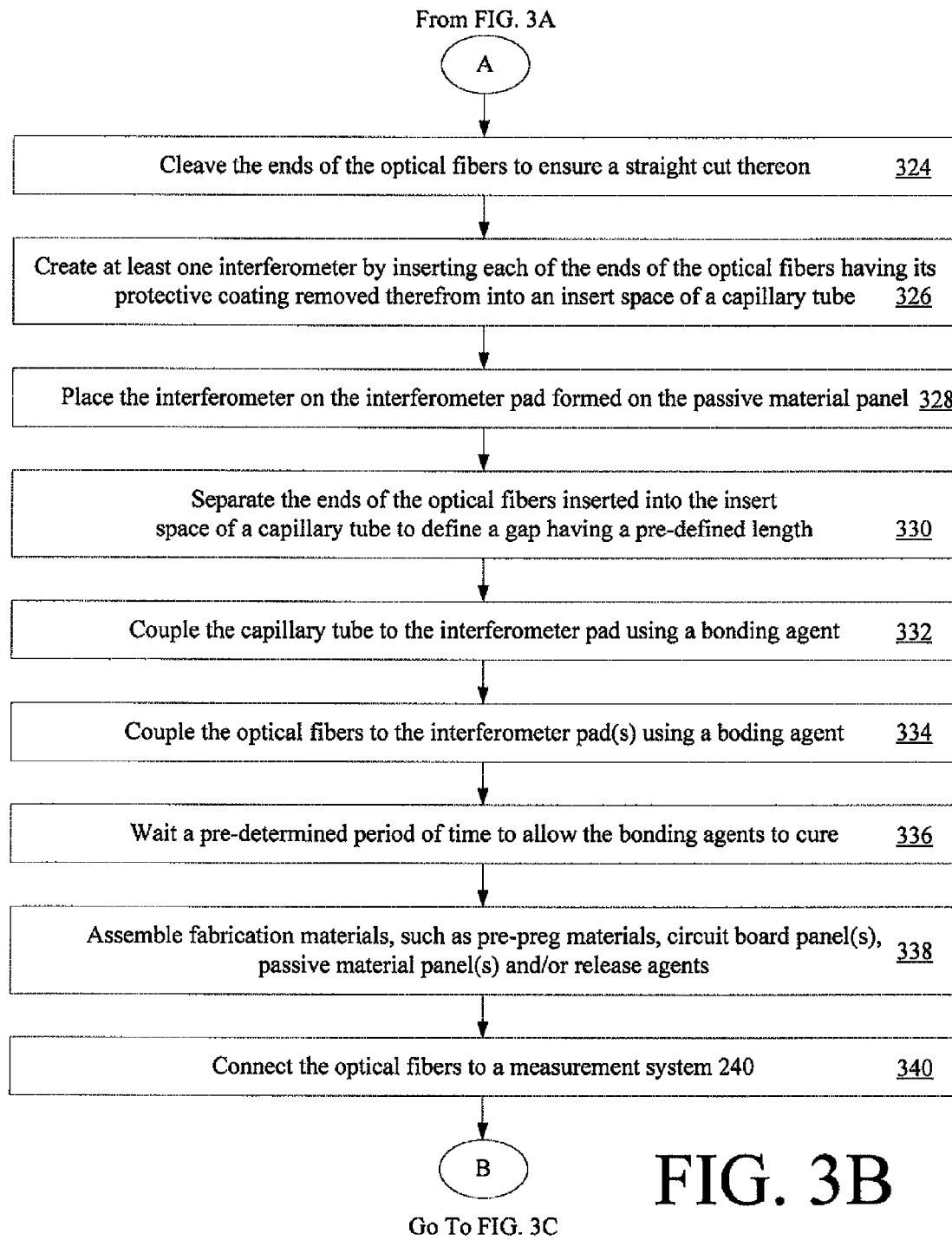

Referring now to FIG. 3B, step 324 involves cleaving the ends of the optical fibers 214, 220 with a sharp instrument to create a perfectly flat end face, perpendicular to the longitudinal axis of the optical fiber. Step 326 involves forming at least one interferometer by inserting each of the ends of the optical fibers 214, 220, which have the pre-defined portion of the protective coating removed therefrom, into an insert space of a capillary tube.

Figure 8:
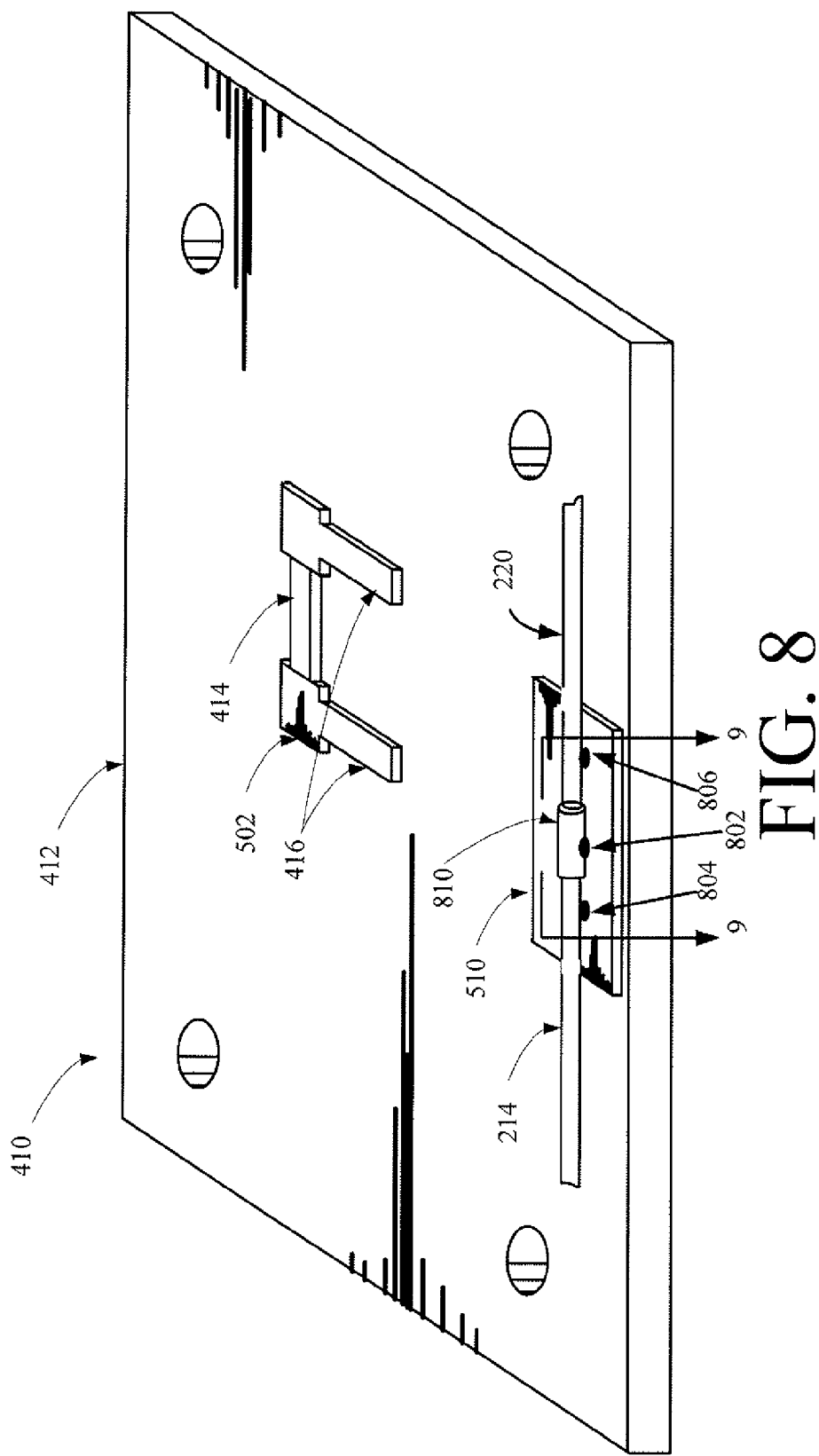
FIG. 8 is a schematic illustration of an interferometer placed on the sample pad that is useful for understanding the present invention.

A schematic illustration of a process for making the interferometer is provided in FIG. 7. As shown in FIG. 7, the end 702 of the optical fiber 214 is inserted into an insert space 714 of the capillary tube 712. Similarly, an end 716 of the optical fiber 220 is inserted into an insert space 714 of the capillary tube 712. The resulting interferometer 810 is shown in FIG. 8. Notably, the capillary tube 712 mechanically supports the optical fibers 214, 220 so as to allow the coupling of light source 208 from optical fiber 214 to optical fiber 220 during a lamination process. In this regard, it should be understood that the capillary tube 712 provides a means for maintaining alignment of the optical fibers 214, 220 throughout the lamination process. The insert space 714 has a diameter selected to be larger than the diameters of optical fibers 214, 220. For example, the insert space 714 has a diameter of 132 microns. Embodiments of the present invention are not limited in this regard.

Upon completing step 326, step 328 is performed where the interferometer 810 is placed on the sample pad 510 formed on the passive material panel 410. A schematic illustration of the interferometer 810 placed on the sample pad 510 is shown in FIG. 8.

In a next step 330, the ends of the optical fibers 214, 220 inserted into the capillary tube 712 of the interferometer 810 are separated so as to define a gap therebetween. The gap has a pre-defined length selected in accordance with a particular fabrication application. As such, the length of the gap can vary. According to embodiments of the present invention, the gap has a length defined be mathematical equation (3).

$$L_4 = W_{Core} + W_{Cladding} \qquad (3)$$

where $L_4$ represents the length of the gap formed between two optical fibers. $W_{Core}$ represents the diameter of a core of an optical fiber. $W_{Cladding}$ represents the diameter of the cladding of an optical fiber. Embodiments of the present invention are not limited in this regard. Notably, the length $L_4$ of the gap will change during the lamination process as a result of the expansion and contraction of the sample pad of passive material. Embodiments of the present invention are not limited in this regard.

Figure 9:
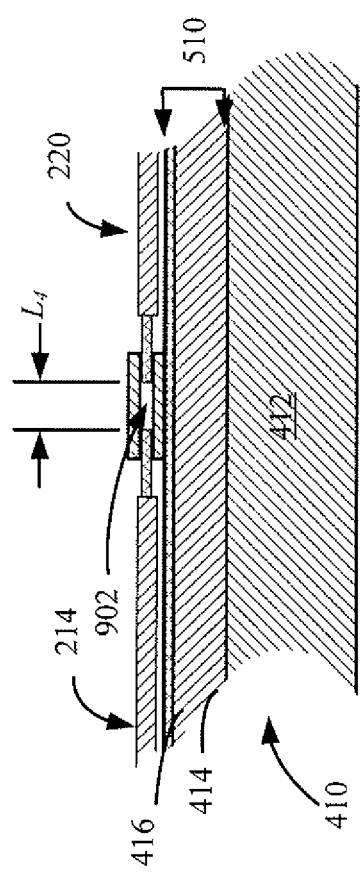
FIG. 9 is a schematic illustration of the interferometer of FIG. 8 with a gap created between its optical fibers.

A schematic illustration of gap 902 formed between optical fibers 214, 220 is shown in FIG. 9. The gap 902 has a length $L_4$ selected in accordance with a particular application. For example, the length $L_4$ is 125 microns. Embodiments of the present invention are not limited in this regard.

Referring again to FIG. 3B, the fabrication process continues with steps 332 and 334. In step 332, the capillary tube 712 is secured to the sample pad 510 using a glue or bonding agent. The glue or bonding agent holds the capillary tube 712 stationary during a lamination process. In a next step 334, the optical fibers 214, 220 are coupled to the sample pad 510 using a glue or bonding agent. The glue and/or bonding agent can include any glue and/or bonding agent that can withstand high temperatures and will not interfere with the compression of the fabrication materials during a lamination process.

A schematic illustration of the capillary tube 712 and optical fibers 214, 220 coupled to the sample pad 510 by a bonding agents 802, 804, 806 is shown in FIG. 8. Notably, the optical fibers 214, 220 are aligned with a central axis of the capillary tube 712 so that they can move freely within the capillary tube 712 along an axial direction defined by the central axis of the capillary tube. The location along the optical fibers 214, 220 at which they are bonded to the sample pad 510 is selected in accordance with a particular fabrication application. For example, the location can be selected to be one (1) inch from the center of the gap 902. Embodiments of the present invention are not limited in this regard.

After coupling the capillary tube 712 and optical fibers 214, 220 to the sample pad 510, the fabrication process 300 continues with step 336. In step 336, a predetermined period of time (e.g., 24 hours) is allowed to lapse so that the glue and/or bonding agents 802, 804, 806 are allowed to cure.

Upon expiration of the predetermined period of time, step 338 is performed where fabrication materials are assembled. The fabrication materials can include, but are not limited to, at least one circuit board panel 400, at least one passive material panel 410, at least one pre-preg material and at least one release agent. A release agent can be provided to prevent adhesion of the circuit board panel 400 and/or the passive material panel 410 to the lamination device 110 when heat and pressure are applied thereto. The release agents can include, but are not limited to, films, wax sheets and release liners. For example, the release agents may consist of a TEFLON® liner. Alternatively, a low surface energy release film may be applied to a top and bottom surface of the fabrication materials.

Figure 10:
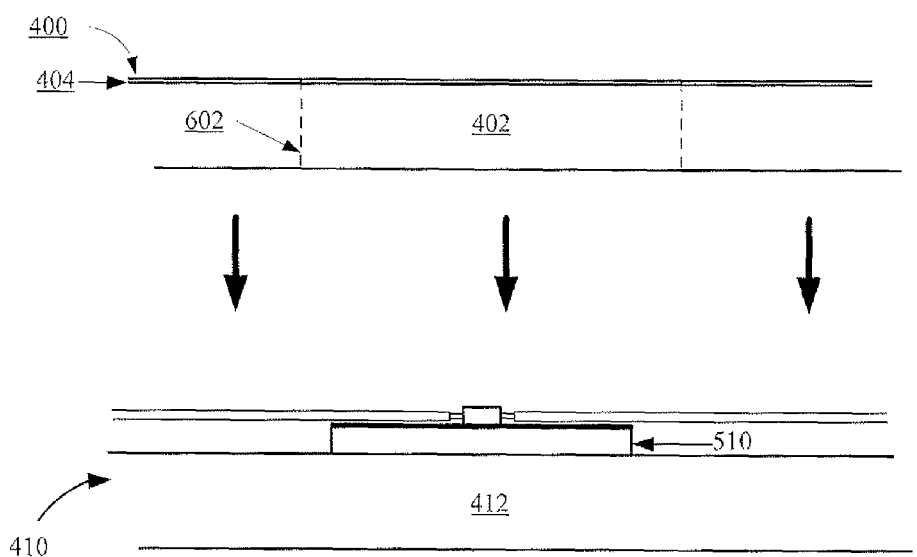
FIG. 10 is a schematic illustration of a process for assembling fabrication materials that is useful for understanding the present invention.

A schematic illustration of a process for assembling the fabrication materials is shown in FIG. 10. As shown in FIG. 10, the process involves disposing the circuit board panel 400 on top of the passive material panel 410 so that the interferometer aperture 602 is aligned with the sample pad 510. Although not shown in FIG. 10, a filler material and/or pre-preg material may be inserted between the circuit board panel 400 and the passive material panel 410. Also, a release agent may be disposed on top of the circuit board panel 400 and below the passive material panel 410.

The pre-preg material is used to bond the circuit board panel 400 to the passive material panel 410. The pre-preg material includes a resin that will flow when heat is applied thereto. If the resin flows into the capillary tube 712 of the interferometer 810 and cures therein, then it will interfere with the operation of the interferometer 810, i.e., the optical fibers 214, 220 will be prevented from moving with a passive material during a lamination process. In order to prevent this interference of the interferometer's operation, the sample pad 510 is formed so as to have a certain height which can ensure that the resin will not reach the capillary tube 712. In this regard, it should be understood that the peripheral walls of the sample pad 510 prevent the resin from flowing around the interferometer 810. As such, the structure of the sample pad 510 may depend on the thickness of a passive material layer 414 and/or conductive metal layer 416 of a passive material panel 410. If the thickness of a passive material layer 414 is suitable for ensuring that the resin will not reach the capillary tube 712, then the sample pad 510 may be absent of a conductive metal layer 416.

Figure 11:
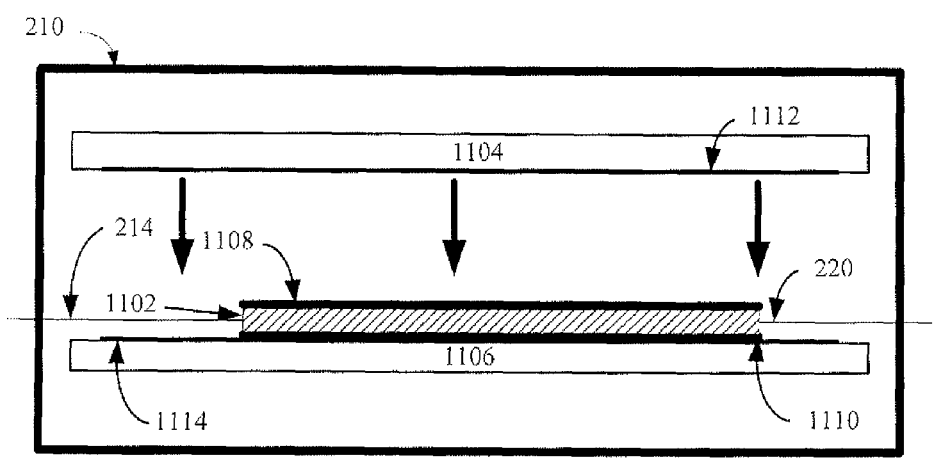
FIG. 11 is a schematic illustration of fabrication materials disposed within the lamination device shown in FIG. 1 that is useful for understanding the present invention.

Referring again to FIG. 3B, the fabrication process 300 continues with step 340. In step 340, the optical fibers 214, 220 are connected to the measurement system 240. More particularly, the optical fiber 214 is connected to port 4 of the splitter 206. Optical fiber 220 is connected to the load 222. After the optical fibers 214, 220 have been connected to the measurement system 240, step 342 of FIG. 3C is performed. Step 342 involves placing the fabrication materials in the lamination device 210. As schematic illustration of fabrication materials 1102 disposed with in the lamination device 210 is shown in FIG. 11. As shown in FIG. 11, the fabrication materials 1102 are disposed on a pressure plate 1106 of the lamination device 210 such that its surface 1110 abuts heater element 1114. Heater element 1114 includes strip heaters mounted to the pressure plate 1110. Embodiments of the present invention are not limited in this regard.

Figure 12:
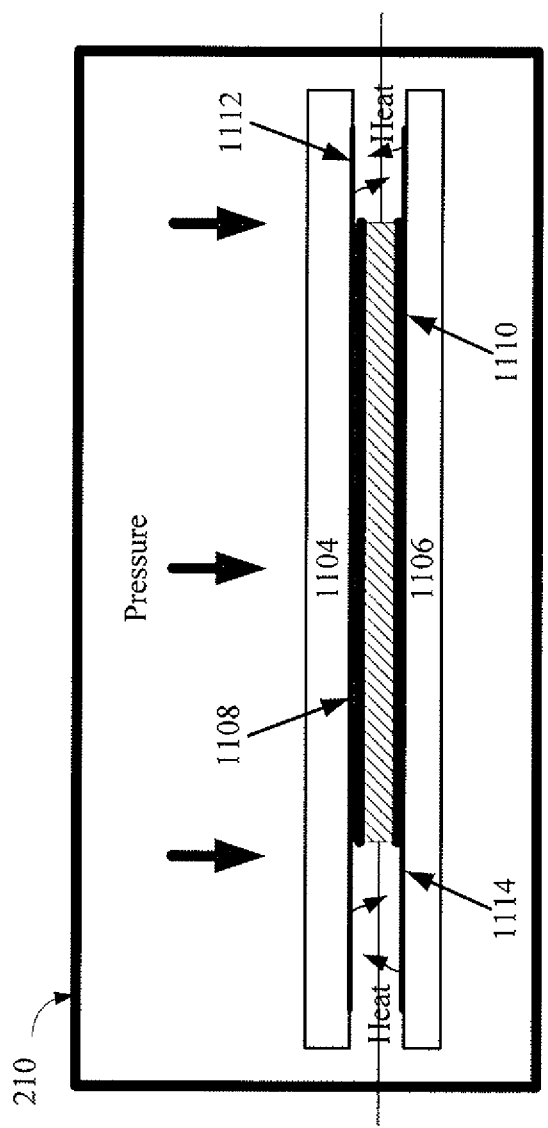
FIG. 12 is a schematic illustration of heat and pressure being applied to the fabrication materials that is useful for understanding the present invention.

In a next step 344 of FIG. 3C, heat and pressure are applied to the fabrication materials disposed in the lamination device 210. A process for applying pressure and heat to the fabrication materials 1102 is provided in FIGS. 11-12. As shown in FIGS. 11-12, a pressure plate 1104 is lowered until it applies a certain amount of pressure to the fabrication materials 1102. When the pressure plate 1104 engages the fabrication materials 1102, a heater element 1112 of the pressure plate 1104 abuts a surface 1108 of the fabrication materials 1102. However, the pressure plate 1104 does not touch the interferometer 810. As also shown in FIG. 12, the heater elements 1112, 1114 apply heat to the surfaces 1108, 1110 of the fabrication materials 1102.

Referring again to FIG. 3C, the fabrication process 300 continues with step 346 where the amount of heat applied to the fabrication materials is increased. The temperature is increased until the temperature of the fabrication materials 1102 reaches a preselected value (e.g., 200° C.). The temperature is held at the preselected value for a certain period of time (e.g., 2 hours). As the heat is increased, temperature changes of the fabrication materials 1102 are measured in step 348.

As also shown in FIG. 3C, an expansion and contraction of a passive material is measured in a step 350 while heat and pressure are being applied to the fabrication materials. The expansion and contraction can be measured in one or more directions (e.g., the x, y and z directions) using one or more interferometers. A process for measuring the expansion and contraction of a passive material during a lamination process will be explained in relation to FIGS. 13A-13E.

Figure 13A:
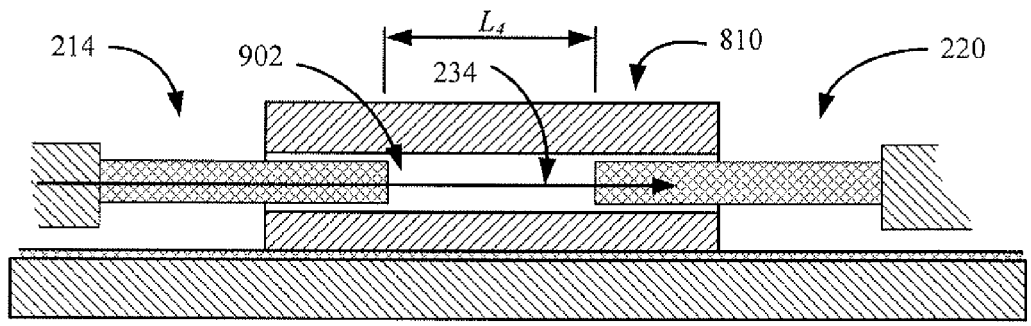
FIGS. 13A-13E show the effects of an expansion and contraction of a passive material during a lamination process on a light beam propagating in an optical fiber coupled to the passive material.

As shown in FIG. 13A, a light beam 234 is propagated along an optical fiber 214 from the light source 208 towards the interferometer 810. When the passive material 414 does not expand or contract during the lamination process, the length $L_4$ of the gap 902 formed between the optical fibers 214, 220 remains the same. In this scenario, the light beam 234 is coupled from the optical fiber 214 to the optical fiber 220. In effect, the detector 204 will output a data signal 230a with a constant voltage value (i.e., no fringes will occur).

Figure 13B:
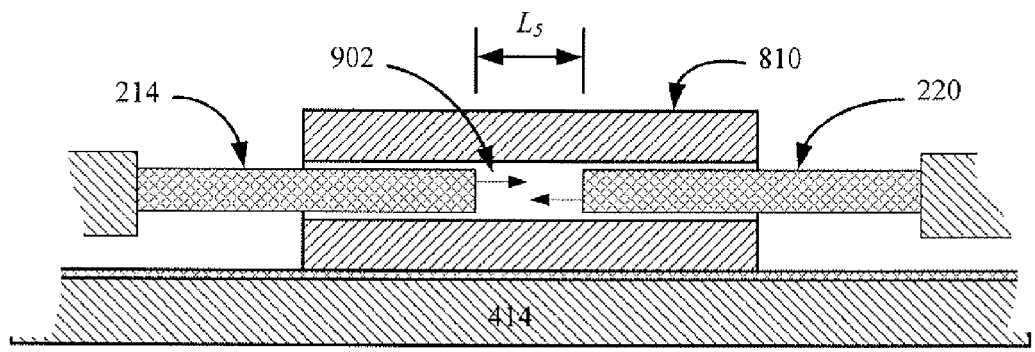
Figure 13C:
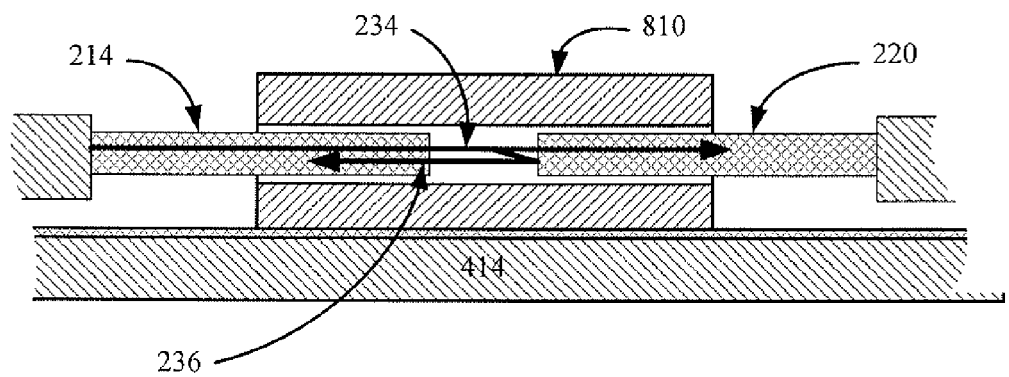
Figure 13D:
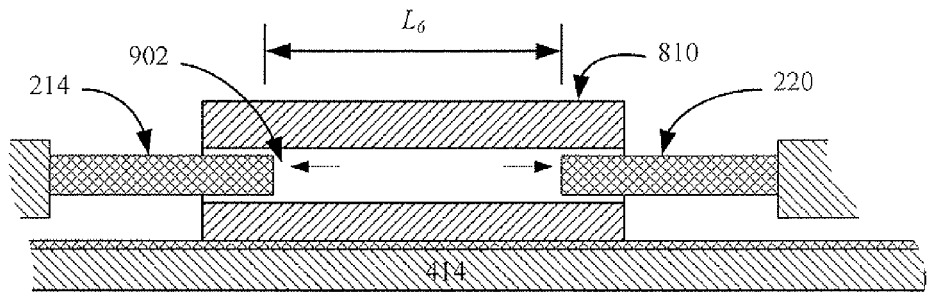
Figure 13E:
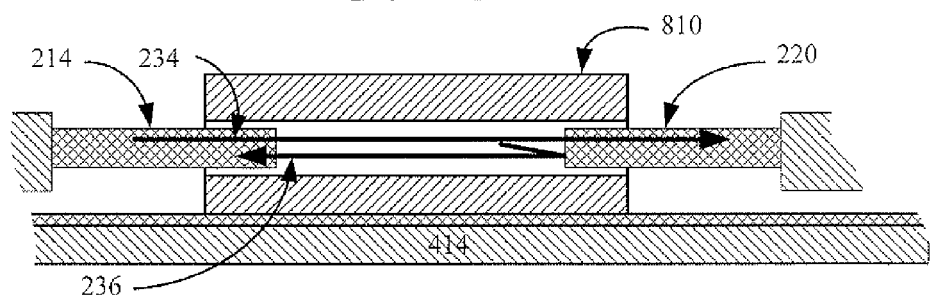

As shown in FIGS. 13B and 13E, a light beam 234 is propagated along an optical fiber 214 from the light source 208 towards the interferometer 810. When the passive material 414 contracts during a lamination process, the length of the gap 902 formed between the optical fibers 214, 220 decreases from length $L_4$ to length $L_5$ as shown in FIG. 13B. Similarly, when the passive material 414 expands during a lamination process, the length of the gap 902 formed between the optical fibers 214, 220 increases from length $L_4$ to length $L_6$ as shown in FIG. 13D. Notably, any adhesion of the optical fibers 214, 220 outside of the sensor length (i.e., the length between contact points 804 and 806 shown in FIG. 8) does not hinder the sensor response, i.e., does not adversely affect the changes in the length of the gap 902 as the passive material expands and contracts. As such, the sensor response of the interferometer 810 is not hindered by the embedment of portions of the optical fibers 214, 220 between panels 400, 410. In fact, the embedment of portions of the optical fibers 214, 220 between panels 400, 410 helps move the optical fibers 214, 220 by further pulling and pushing the optical fibers 214, 220. The pushing and pulling of the optical fibers 214, 220 assists in changing the length of the gap 902 when a sample of passive material contracts and expands.

In the contraction and expansion scenarios, a reflected light beam 236 propagates along the optical fiber 214 towards the splitter 206. The light beam 236 interferes with light beam 234. The light beam 232' resulting from the signal interference propagates along optical fiber 216 towards the detector 204. The detector 204 converts the amplitude of the light beam 232' into voltage values. The voltage values are communicated from the detector 204 to the computing device 202 via data signal 230a. Notably, the data signal 230a has voltage values that represent the phase differences between the light beams 234 and 236 resulting from the changes in the gap 902 formed between the optical fibers 214, 220.

Figure 14:
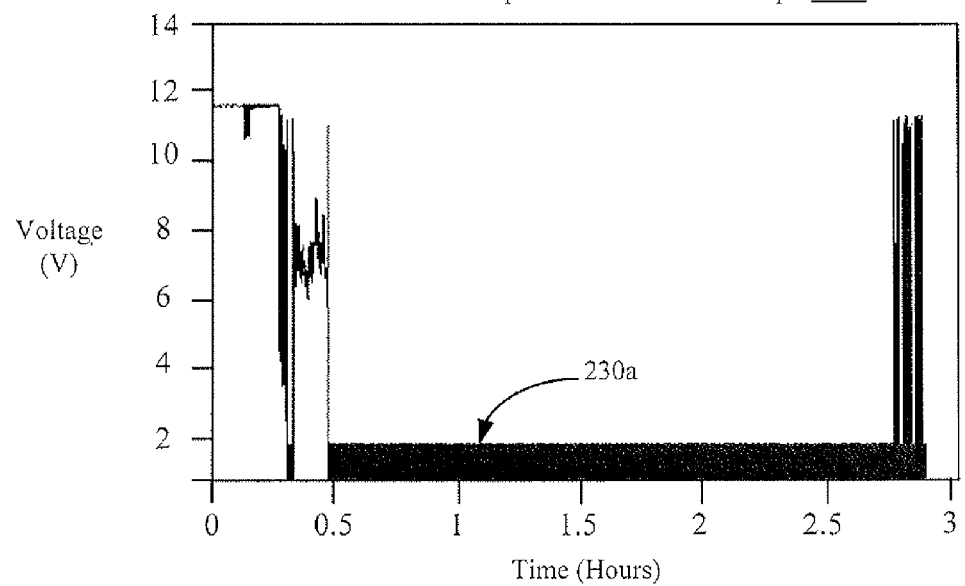
FIG. 14 is a graph showing changes in a phase response of a light beam propagating in an optical fiber during a lamination process.

An interferometer expansion/contraction graph 1400 showing changes in the phase response of a light beam 234 propagating in the optical fiber 214 during the lamination process is provided in FIG. 14. As shown in FIG. 14, the voltage values of the data signal 230a vary during the first half an hour of a lamination process. The varying voltage values represent phase differences between the light beams 234 and 236 resulting from the changes in the gap 902 formed between the optical fibers 214, 220. Notably, the temperature applied to the fabrication materials is increased during this first half an hour of the lamination process.

Referring again to FIG. 3C, the fabrication process 300 continues with a decision step 352. Step 352 involves determining if the predefined period of time (e.g., 2 hours) has lapsed. If the predefined period of time has not lapsed [352: NO], then the fabrication process 300 returns to step 352. If the predefined period of time has lapsed [352:YES], then the fabrication process 300 continues with step 354. In step 354, the temperature applied to the fabrication materials is decreased. While the temperature is being decreased steps 356 and 358 are performed.

Step 356 involves measuring changes in the temperature of a fabrication materials. Step 358 involves measuring the expansion and contraction of the passive material in an x, y and/or z direction as the heat applied thereto is decreased. As shown in FIG. 14, the voltage values of the data signal 230a vary during the last half hour of a lamination process. The varying voltage values represent phase differences between the light beams 234 and 236 resulting from the changes in the gap 902 formed between the optical fibers 214, 220. Notably, the temperature applied to the fabrication materials is decreased during this last half hour of the lamination process.

It should be understood that the sample pad 510 will contract substantially to its original shape as the temperature is decreased. However, a portion of each optical fiber 214, 220 will be laminated between the panels 400, 410 when the lamination material (e.g., pre-preg or resin) cures. In effect, the optical fiber 214, 220 will then move with the substrate materials 402, 412 of the panels 400, 410 and with the sample pad 510. More particularly, the optical fibers 214, 220 will be stretched when the laminated panels 400, 410 and sample pad 510 contract. In effect, the diameters of the optical fibers 214, 220 decrease, thereby affecting the magnitude of power of the light beam passing therethrough. In this way, the "set temperature" of the pre-preg material can be measured. As noted above, the set temperature of the pre-preg material can be used for real-time quality control purposes. For example, if the temperature ramping of a lamination process changes beyond a desired profile, then data defining said changes will be fed back to a technician. The technician can use this data to adjust or repair a lamination machine so that the temperature ramping of a next iteration of a lamination process will not change beyond the desired profile.

Figure 3D:
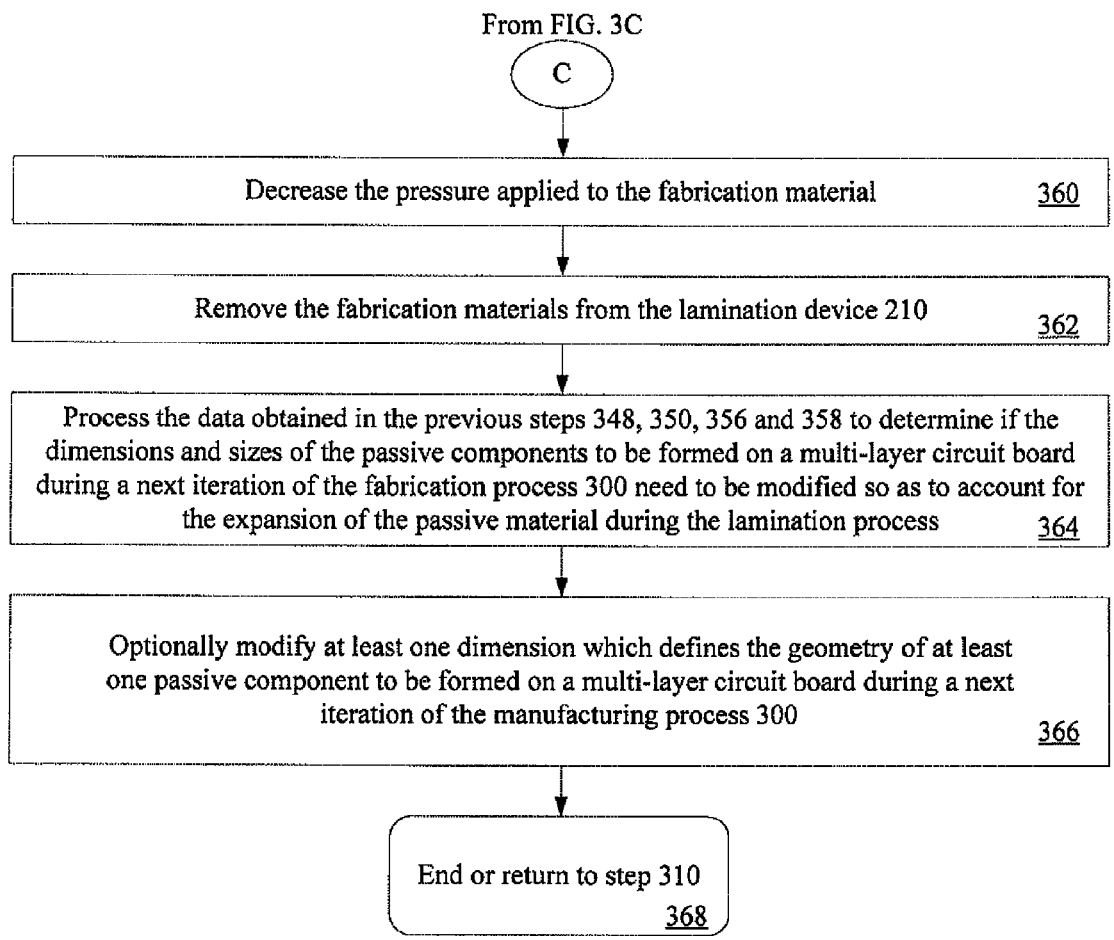

Referring again to FIG. 3C, the fabrication process 300 continues with steps 360-366 of FIG. 3D. In step 360, the pressure applied to the fabrication materials is decreased. Upon completing step 360, the fabrication materials are removed from the lamination device 110 in a next step 362. In step 364, the data obtained in the previous steps 348, 350, 356 and 358 is processed to determine if the dimensions and sizes of the passive components to be formed on a multi-layer circuit board during a next iteration of a fabrication process 300 need to be modified. The modification can be performed to account for the expansion and contraction of passive materials during the lamination process. For example, the interferometer data can be processed to determine the final size and electrical value of an embedded passive component. This information can then be used to manually or automatically adjust the dimensions of a passive component to be formed on a multi-layer circuit board. Thereafter, step 366 is performed where at least one dimension which defined the geometry of at least one passive component is optionally modified. Subsequent to the completion of step 366, step 364 is performed where the fabrication process 300 ends or returns to step 310.

As evident from the above discussion, a variation in the geometry of an embedded passive material can be predicted by measuring the temperature, time and change in the distance between optical fibers of an interferometer. The predicted variation in the geometry of an embedded passive material can be fed back to a neural analysis of an embedded passive process. The phrase "neural analysis", as used herein, refers to an adaptive, linear/nonlinear statistical data modeling process. A neural analysis is often used to model complex relationships between measured resistance or capacitance values and outputs of the neural analysis which are used to adjust embedded passive component dimensions. In effect, the tolerances of embedded passive components are tightened. Consequently, the embedded passive components of the present invention have relatively high circuit performances as compared to conventional embedded passive components.

Although the present invention was described above in relation to a Fabry-Perot interferometer based system, embodiments of the present invention are not limited in this regard. For example, a Michelson interferometer based system or a Mach-Zehnder interferometer based system can be used in addition to or alternatively to the Fabry-Perot interferometer.

Figure 15:
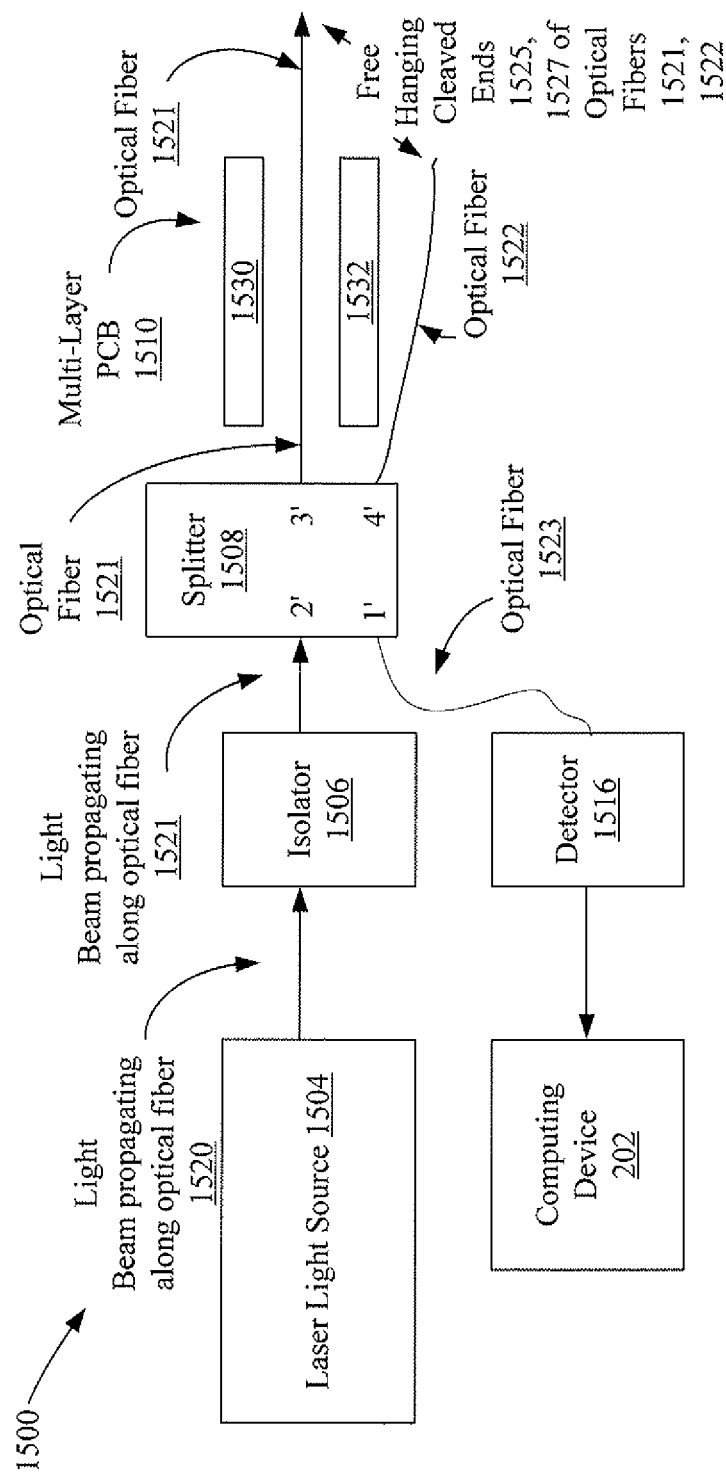
FIG. 15 is a schematic illustration of an exemplary Michelson interferometer based system.

A schematic illustration of an exemplary Michelson interferometer based system 1500 is provided in FIG. 15. The exemplary Michelson interferometer based system 1500 can be used in conjunction with or alternative to the Fabry-Perot interferometer. The Michelson interferometer based system 1500 can be used to determine the real-time expansion of a passive material during a lamination process in a plurality of directions (i.e., the x, y and z directions). Notably, the Michelson interferometer can measure the real-time expansion of a passive material in the z direction (i.e., a change in thickness thereof). This "z" measurement is achieved by applying a pressure on a circuit board having the Michelson interferometer disposed therein. As the pressure applied to the circuit board is increased, at least a portion of the Michelson interferometer (i.e., an optical fiber 1521) will deform. The amount of deformity is directly related to the change in the "z" dimension or thickness of the passive material due to the pressure.

As shown in FIG. 15, system 1500 comprises a light source 1504, an isolator 1506, a splitter 1508, a multi-layer Printed Circuit Board (PCB) 1510, a detector 1516 and a computing device 202. A light beam emitted from the laser light source 1504 propagates along the optical fiber 1520 towards the isolator 1506. The isolator 1506 prevents reflected light beams from flowing along the optical fiber 1520 towards the laser light source 1504. The light beam is then coupled to an optical fiber 1508. The light beam propagates along the optical fiber 1508 towards the splitter 1508. The splitter 1508 is the same as or substantially similar to the splitter 206 shown in FIG. 2. As such, the discussion provided above in relation to the splitter 206 is sufficient for understanding the splitter 1508.

A first optical fiber 1521 is disposed within layers 1530, 1532 of the multi-layer PCB 1510. The optical fiber 1521 is glued to the passive material of the multi-layer PCB 1510 at end points (not shown in FIG. 15) thereof. The cleaved end 1525 of the optical fiber 1521 is not connected to a load. Instead, the cleaved end 1525 of optical fiber 1521 is a free hanging end. As such, the optical fiber 1521 generally acts as a movable reflecting mirror. Notably, the multi-layer PCB 1510 is absent of an interferometer aperture. A second optical fiber 1522 is also connected to the splitter 1508. The cleaved end 1527 of the optical fiber 1522 is not connected to a load. Instead, the end 1527 is a free hanging end. As such, the optical fiber 1522 acts as a reflecting mirror. A third optical fiber 1523 is connected from the splitter 1508 to the detector 1516. The output of the detector 1516 is the same as the detector 204 of FIG. 2.

During operation, a light beam is transmitted from the laser light source 1504 to the splitter 1508 through the isolator 1506. The splitter 1508 sends the light beam through its ports 1', 3' and 4'. The ends 1525, 1527 of the optical fibers 1521, 1522 act as reflection mirrors. When geometric changes of the passive material do not occur in any of the three (3) dimensions, the detector 1516 will detect no phase change in the light beam. In effect, the detector 1516 will output a data signal with a constant voltage value (i.e., no fringes will occur).

When the multi-layer PCB 1510 either contracts, expands or is compressed in the z direction, the reflected power from the optical fiber 1521 changes. The optical fiber 1522 acts as a reference arm. In effect, the reflected light beam propagating along optical fiber 1521 interferes with the light beam propagating along optical fiber 1522. The light beam resulting from the signal interference propagates along optical fiber 1523 towards the detector 1516. The detector 1516 converts the amplitude of the resulting light beam into voltage values. The voltage values are communicated from the detector 1516 to the computing device 202 via data signal.

According to an embodiment of the present invention, two (2) Fabry Perot interferometers are used to measure geometric changes of a sample of a passive material in the x and y directions. The geometric changes of the sample of passive material in the x, y and z directions are determined using a Michelson interferometer. The responses from the three (3) interferometers are compared to each other and/or combined with each other to yield final values. Embodiments of the present invention are not limited in this regard.

Figure 16:
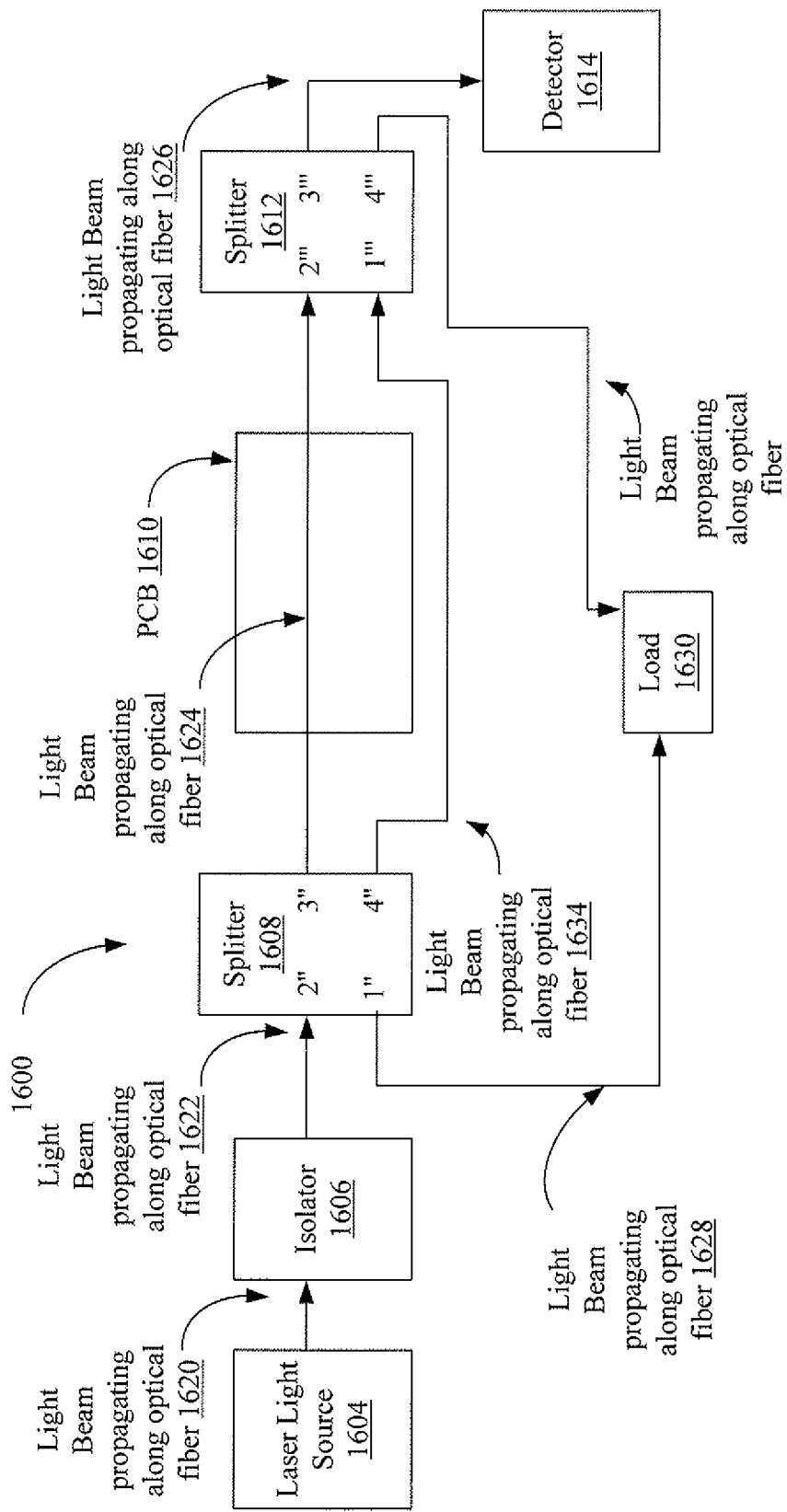
FIG. 16 is a schematic illustration of an exemplary Mach-Zehnder interferometer based system.

A schematic illustration of an exemplary Mach-Zehnder interferometer based system 1600 is provided in FIG. 16. The exemplary Mach-Zehnder interferometer based system 1600 can be used in conjunction with or alternative to the Fabry-Perot interferometer. The Mach-Zehnder interferometer based system 1600 can be used to determine the real-time expansion of a passive material during a lamination process in a plurality of directions (i.e., the x, y and z directions). Notably, the Mach-Zehnder interferometer can measure the real-time expansion of a passive material in the z direction (i.e., a change in thickness thereof). This "z" measurement is achieved by applying a pressure on a circuit board having the Michelson interferometer disposed therein. As the pressure applied to the circuit board is increased, at least a portion of the Mach-Zehnder interferometer (i.e., an optical fiber 1624) will deform. The amount of deformity is directly related to the change in the "z" dimension or thickness of the passive material due to the pressure.

As shown in FIG. 16, system 1600 comprises a laser light source 1604, an isolator 1606, splitters 1608, 1612, a multi-layer PCS 1610, a detector 1614 and a load 1630. A source light beam emitted from the light source 1604 propagates along an optical fiber 1620 towards the isolator 1606.

The isolator 1606 prevents reflected light beams from flowing along the optical fiber 1620 towards the laser light source 1604. The light beam is then coupled to an optical fiber 1622. The light beam propagates along the optical fiber 1622 towards the splitter 1608. The splitter 1608 splits the source light beam into three (3) light beams. A first one of the light beams propagates along an optical fiber 1628 towards a load 1630. A second one of the light beams propagates along an optical fiber 1624 towards the PCB 1610 and splitter 1612. The optical fiber 1624 is attached to a passive material of the PCB 1610. A third one of the light beams propagates along an optical fiber 1634 towards the splitter 1612. The splitter 1612 combines the second and third light beams to form a resulting light beam. The resulting light beam propagates along optical fiber 1626 towards the detector 1614. The detector 1614 converts the amplitude values of the resulting light beam into analog voltage values.

Notably, in this scenario, the analog voltage values represent the phase differences between the light beam propagating along the optical fiber 1624 and the light beam propagating along an optical fiber 1634 resulting from the stretching and compression movements of optical fiber 1624. The stretching and compression movements of optical fiber 1624 occur when the passive material to which the optical fiber 1624 is attached expands and contracts during the lamination process. The phase and amplitude of the light beam propagating along an optical fiber 1624 are affected by the three dimensional movements and temperature of the optical fiber 1624. It should be noted that the Mach-Zehnder interferometer based system 1600 does not utilize an interferometer aperture. As such, the interferometer structure (i.e., optical fiber 1624) is disposed between layers of a multi-layer circuit board.

As evident from the above discussion, the Michelson and Mach-Zehnder interferometers can be used to measure geometric changes of a sample of a passive material in the three (3) directions (i.e., the x, y and z directions). The Fabry-Perot interferometers can be used to determine geometric changes of a sample of a passive material in two (2) of the three (3) directions. Other methods of determining geometric changes of a passive material in the (x,y), (x,z) or (y,z) directions can be used with the Fabry-Perot interferometers to determine the geometric changes of a passive material in the z direction. A neural analysis or other program can be used to determine the variations from the detectors. All of the interferometer sensors detect variations in the form of phase variations. The phase changes manifest themselves in analog varying voltage signals output from the detectors. The oscillations of the analog varying voltage signals are referred to as fringes. The same fringe equation can be used for the Michelson and Mach-Zehnder interferometer applications as in the Fabry-Perot interferometer application.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for measuring changes in geometry occurring to elements formed of a material layer disposed on a first substrate when heat and pressure are applied to said material layer and said first substrate during a lamination process, comprising:
   forming from said material layer at least one passive circuit component and at least one sample pad disposed on said substrate;
   forming a multi-layer structure by placing at least a second substrate panel on top of said first substrate so that said passive circuit component is disposed between said first substrate and said second substrate;
   directly measuring with an interferometer dimensional changes in at least a length or a width occurring to said sample pad while applying heat and pressure to said multi-layer structure as part of a lamination process; and
   determining at least one of a final geometric shape and an electrical value of said passive circuit component that was embedded between said first and second substrates during said lamination process, based on said dimensional changes which were previously measured for said sample pad.

2. The method according to claim 1, further comprising positioning at least a portion of an interferometer structure on said sample pad before performing said measuring step.

3. The method according to claim 2, wherein said positioning step includes securing a first optical fiber and a second optical fiber directly to said sample pad.

4. The method according to claim 3, further comprising positioning said first optical fiber axially aligned with said second optical fiber, with an end of said first optical fiber spaced a distance from an end of said second optical fiber.

5. The method according to claim 1, further comprising selecting said interferometer from the group consisting of a Fabry-Perot interferometer, a Michelson interferometer and a Mach-Zehnder interferometer.

6. The method according to claim 1, further comprising measuring temperature changes at said sample pad concurrently with applying said pressure and said heat to said multi-layer structure.

7. The method according to claim 1, further comprising selecting said material layer to include a plurality of stacked layers.

8. The method according to claim 7, further comprising selecting said plurality of stacked layers to include a metal layer and a passive component material layer used to form said passive circuit components on said substrate.

9. The method according to claim 1, further comprising modifying a geometry of said passive circuit component in response to said measuring step to compensate for expansion and contraction of said material layer during said lamination process.

10. The method according to claim 1, further comprising providing an aperture in said second substrate panel aligned with said sample pad, said aperture having an overall size that is larger than an overall size of said sample pad.

11. A system for measuring changes in geometry occurring to elements formed of a material layer disposed on a first substrate when heat and pressure are applied to said material layer and said first substrate during a lamination process, comprising:
   at least one passive circuit component and at least one sample pad formed from said material layer and disposed on said substrate;
   at least a second substrate panel on top of said first substrate to form a multi-layer structure with said passive circuit component disposed between said first substrate and said second substrate;
   an optical measurement structure disposed on said sample pad to form at least a portion of an interferometer, wherein said interferometer is configured to directly measure dimensional changes in at least one of a length or a width occurring to said sample pad while applying heat and pressure to said multi-layer structure as part of a lamination process; and
   a processing device configured to determine at least one of a final geometric shape and an electrical value of said passive circuit component that was embedded between said first and second substrates during said lamination process, based on said dimensional changes which were previously measured for said sample pad.

12. The system according to claim 11, wherein said optical measurement structure is comprised of a first optical fiber and a second optical fiber, each secured directly to said sample pad.

13. The system according to claim 12, wherein said first optical fiber is axially aligned with said second optical fiber, and an end of said first optical fiber is spaced a distance from an end of said second optical fiber.

14. The system according to claim 13, further comprising a capillary tube secured to said sample pad, wherein said first optical fiber and said second optical fiber are disposed in axial alignment within said capillary tube and movable relative to each other and said capillary tube along a common axis.

15. The system according to claim 11, wherein said interferometer is selected from the group consisting of a Fabry-Perot interferometer, a Michelson interferometer and a Mach-Zehnder interferometer.

16. The system according to claim 11, wherein said interferometer comprises a Fabry-Perot interferometer, and a Michelson interferometer or a Mach-Zehnder interferometer.

17. The system according to claim 11, further comprising a temperature sensor configured for measuring temperature changes at said sample pad concurrently with applying said pressure and said heat to said multi-layer structure.

18. The system according to claim 11, wherein said material layer includes a plurality of stacked layers.

19. The system according to claim 18, wherein said plurality of stacked layers includes a metal layer and a passive component material layer.

20. The system according to claim 11, wherein said processing device is further configured to receive data collected by said interferometer, and to determining a modified geometry of said passive circuit component in response to said data to compensate for expansion and contraction of said material layer during said lamination process.

21. A method for fabricating a circuit board, comprising:
   forming from a material layer disposed on a first substrate panel at least one passive circuit component and at least one sample pad;
   positioning at least a portion of an interferometer structure on said sample pad;
   forming a multi-layer structure by placing at least a second substrate panel on top of said first substrate panel so that said passive circuit component is disposed between said first substrate panel and said second substrate panel;

directly measuring dimensional changes in at least a length and a width occurring to said sample pad while applying heat and pressure to a multi-layer structure as part of a lamination process; and determining a final geometric shape of said passive circuit component that was embedded between said first and second panels during said lamination process, based on said dimensional changes which were previously measured for said sample pad.

22. The method according to claim 21, wherein said positioning step includes securing at least one optical fiber to said sample pad.

23. The method according to claim 21, wherein said positioning step further comprises positioning a first optical fiber in axial alignment with a second optical fiber, wherein an end of said first optical fiber is spaced a distance from an end of said second optical fiber.

24. The method according to claim 21, further comprising selecting said interferometer structure from a group consisting of a Fabry-Perot interferometer, a Michelson interferometer and a Mach-Zehnder interferometer.

25. The method according to claim 21, wherein said material layer includes a plurality of stacked layers.

26. The method according to claim 25, wherein said plurality of stacked layers includes a metal layer and a passive component layer used to form said passive circuit component on said first substrate panel.

27. The method according to claim 21, further comprising providing an aperture in said second substrate panel aligned with said sample pad, said aperture having an overall size that is larger than an overall size of said sample pad.

28. The method according to claim 1, further comprising measuring with said interferometer a set temperature of a pre-preg material, and using said set temperature for real-time quality control purposes.

* * * * *